United States Patent
Yagi

(10) Patent No.: US 7,595,443 B2
(45) Date of Patent: Sep. 29, 2009

(54) MUSIC PRACTICE SUPPORTING APPLIANCE

(75) Inventor: Shigeki Yagi, Chiba (JP)

(73) Assignee: Seiko Instruments Inc. (JP)

( * ) Notice: Subject to any disclaimer, the term of this patent is extended or adjusted under 35 U.S.C. 154(b) by 36 days.

(21) Appl. No.: 11/702,804

(22) Filed: Feb. 6, 2007

(65) Prior Publication Data

US 2007/0186757 A1 Aug. 16, 2007

(30) Foreign Application Priority Data

Feb. 14, 2006 (JP) .............................. 2006-037042

(51) Int. Cl.
*G10H 1/44* (2006.01)

(52) U.S. Cl. .......................................... 84/600; 84/454

(58) Field of Classification Search ................... 84/600, 84/454

See application file for complete search history.

(56) References Cited

U.S. PATENT DOCUMENTS

| 4,077,298 | A | * | 3/1978 | Kondo | 84/454 |
| 4,078,469 | A | * | 3/1978 | Calvin | 84/454 |
| 4,319,515 | A | * | 3/1982 | Mackworth-Young | 84/454 |
| 4,481,857 | A | * | 11/1984 | Havener | 84/454 |
| 5,811,708 | A | * | 9/1998 | Matsumoto | 84/610 |
| 6,211,451 | B1 | * | 4/2001 | Tohgi et al. | 84/470 R |
| 6,449,625 | B1 | * | 9/2002 | Wang | 707/206 |
| 6,751,439 | B2 | * | 6/2004 | Tice et al. | 434/350 |
| 7,049,502 | B2 | * | 5/2006 | Taku et al. | 84/454 |
| 7,288,709 | B2 | * | 10/2007 | Chiba | 84/454 |
| 7,323,631 | B2 | * | 1/2008 | Miyaki et al. | 84/616 |
| 7,371,954 | B2 | * | 5/2008 | Masuda et al. | 84/454 |
| 2002/0088333 | A1 | * | 7/2002 | Skubic | 84/477 R |
| 2003/0079097 | A1 | * | 4/2003 | Wei et al. | 711/162 |
| 2004/0025672 | A1 | * | 2/2004 | Carpenter | 84/622 |
| 2004/0055441 | A1 | * | 3/2004 | Katsuta | 84/470 R |
| 2004/0112200 | A1 | * | 6/2004 | Konishi | 84/454 |
| 2004/0139841 | A1 | * | 7/2004 | Capano | 84/454 |
| 2005/0087060 | A1 | * | 4/2005 | Taku et al. | 84/455 |
| 2005/0211064 | A1 | * | 9/2005 | Chiba | 84/454 |
| 2006/0011046 | A1 | * | 1/2006 | Miyaki et al. | 84/616 |
| 2006/0027074 | A1 | * | 2/2006 | Masuda et al. | 84/454 |
| 2006/0088230 | A1 | * | 4/2006 | Silverbrook et al. | 382/313 |
| 2007/0186757 | A1 | * | 8/2007 | Yagi | 84/616 |
| 2007/0222770 | A1 | * | 9/2007 | Silverbrook et al. | 345/179 |
| 2008/0078281 | A1 | * | 4/2008 | Katsuta | 84/609 |

* cited by examiner

*Primary Examiner*—David S. Warren
(74) *Attorney, Agent, or Firm*—Adams & Wilks

(57) ABSTRACT

A music practice supporting appliance has an input unit that inputs a musical sound of a musical instrument and/or vocal music, converts the musical sound into an electric signal, and outputs the electric signal as an input signal. An amplifying unit amplifies the input signal outputted from the input unit. A processing unit processes the amplified input signal to obtain input signal data. A first memory unit stores the input signal data. A second memory unit stores input signal data stored in the first memory unit when the input signal data stored in the first memory unit exceeds a preselected storage capacity of the first memory unit. A control unit controls the first memory unit and the second memory unit so that while the first memory unit is receiving for storage thereinto new input signal data which causes the first memory unit to exceed the preselected storage capacity, portions of input signal data previously stored in the first memory unit are deleted from the first memory unit and are stored in the second memory unit, and the new input signal data is stored in the first memory unit. A display unit displays the input signal data stored in the first and second memory units.

15 Claims, 20 Drawing Sheets

| MEMORY | FILE | TIME | MUSICAL INTERVAL DATA | SOUND VOLUME DATA | AUXILIARY DATA |
|---|---|---|---|---|---|
| FIRST DATA MEMORY | F1 | T3 | DA3 | DB3 | DC3 |
| | | T4 | DA4 | DB4 | DC4 |
| | | ... | ... | ... | ... |
| | | Tn | DAn | DBn | DCn |
| SECOND DATA MEMORY | F1 | T1 | DA1 | DB1 | DC1 |
| | | T2 | DA2 | DB2 | DC2 |
| | F2 | F2T1 | F2DA1 | F2DB1 | F2DC1 |
| | | ... | ... | ... | ... |
| | | F2Tn | F2DAn | F2DBn | F2DCn |
| | F3 | F3T1 | F3DA1 | F3DB1 | F3DC1 |
| | | ... | ... | ... | ... |
| | | F3Tn | F3DAn | F3DBn | F3DCn |

FIG.2

| ITEM | SETTING VALUE | |
|---|---|---|
| | 2 | VERTICAL |
| DISPLAY AREA | | |
| DISPLAY AREA SIZE | UPPER PORTION : 50% | LOWER PORTION : 50% |
| CONTENT OF DISPLAY AREA | UPPER PORTION : MUSICAL INTERVAL | LOWER PORTION : SOUND VOLUME |
| REFERENCE SOUND | UPPER PORTION : B FLAT | LOWER PORTION : INITIAL SOUND |
| ORDINATE UNIT | UPPER PORTION : DEVIATION | LOWER PORTION : VOLUME |
| ORDINATE RANGE | UPPER PORTION : ±50 CENTS | LOWER PORTION : ±5 DB |
| ABSCISSA UNIT | UPPER PORTION : TIME | LOWER PORTION : TIME |
| ABSCISSA RANGE | UPPER PORTION : 10 SECONDS | LOWER PORTION : 10 SECONDS |
| MOVING SPEED | UPPER PORTION : 10 SECONDS/SCREEN | LOWER PORTION : 10 SECONDS/SCREEN |
| DISPLAY MODE | UPPER PORTION : ROLE MODE | LOWER PORTION : ROLE MODE |

FIG.20

MUSIC PRACTICE SUPPORTING APPLIANCE

BACKGROUND OF THE INVENTION

1. Field of the Invention

The present invention relates to a music practice supporting appliance for supporting musical instrument practices and vocal music practices.

2. Description of the Related Art

Electronic tuning devices have been utilized in practices for producing correct sounds and voices. The electronic tuning devices are inputted with sounds of musical instruments and voices to compare musical intervals thereof with predetermined reference musical intervals, thereby displaying deviation therebetween. Also, as a method of improving skills in KARAOKE, a technique is disclosed in JP-A-08-123454, in which a model vocal signal and a practice vocal signal are inputted to detect musical intervals, and a musical interval coordinate trail of the model vocal signal and a musical interval coordinate trail of the practice vocal signal are displayed by display means on a musical interval coordinate whose ordinate represents the musical interval and abscissa represents time in order that shifts between the musical intervals of the model vocal and the musical intervals of the practice vocal can be visually confirmed while singing.

Since the electronic tuning devices can correctly display the deviation between the musical intervals of input sounds and the musical intervals of reference sounds, those electronic tuning devices are useful for supporting musical practices. However, those electronic tuning devices merely display instantaneous conditions of the input sounds, so the following problems occur. That is, in a case where features of produced sounds are grasped and a correcting practice is performed in order to produce an ideal sound, or a practice is performed for stably producing the ideal sound, the conventional electronic tuning devices cannot display information which can be easily recognized.

Also, the conventional technique described in JP-A-08-123454 has the following problem. That is, because the conventional technique is employed for practicing KARAOKE, approximately 1.5 to 2 octaves of a dynamic range of the musical interval are required. Since such a wide dynamic range is displayed on the ordinate, it is difficult to satisfy a demand for recognition of minute shifts in musical intervals as in practices of musical instruments and vocal music.

Also, the conventional technique has another problem. That is, when a user tries to view deviation of a practice vocal signal with respect to a model vocal signal, the display of the model vocal changes with an elapse of time, and therefore, the user can hardly visually confirm a degree of the deviation.

Further, since the conventional technique does not display a change in sound volumes of an input sound, the following problem occurs. That is, the conventional technique cannot support practices of sound volume controls, and practices for stabilizing musical intervals at a time of change of the sound volumes.

SUMMARY OF THE INVENTION

The present invention has been made to solve the above-mentioned problems, and therefore has an object to provide a music practice supporting appliance, which receives an input of sounds (that is, physical amounts to be evaluated, which contain musical intervals and sound volumes) of a musical instrument, vocal music, and the like and acquires and displays deviation between those sounds of a practicing person and predetermined reference sounds with high precision, which can provide such display and instruction regarding a change in the deviation as to be easily grasped by the practicing person as compared with the case of a conventional technique.

According to an aspect of the present invention, there is provided a music practice supporting appliance, which receives an input of a musical sound of a musical instrument and displays deviation of one of a pitch and a sound volume of the inputted musical sound with respect to the one of the pitch and the sound volume of a preset reference sound, including: a signal input unit for receiving the input of the musical sound and outputting the input signal converted into an electric signal; an input signal amplifying unit for amplifying the input signal outputted through the signal input unit; a timer unit for converting the amplified input signal into a rectangular wave and for outputting a timing signal used to store input signal data; a first data memory unit for storing thereinto the input signal data in correspondence with the timing signal; and a display unit for displaying thereon the input signal data stored in the first data memory unit.

According to the aspect of the present invention, in the music practice supporting appliance further including a second data memory unit for storing thereinto, the input signal data, in a case where the input signal data stored in the first data memory unit exceeds a storage capacity thereof, pieces of the input signal data stored in the first data memory unit can be deleted therefrom in an order of old storage of the input signal data, so that the deleted pieces of input signal data are stored in the second data memory unit, and new input signal data can be stored in the first data memory unit.

According to the aspect of the present invention, in the music practice supporting appliance further including a display method setting unit for setting an abscissa and an ordinate, which are displayed on a screen, the display unit can display the abscissa and the ordinate in accordance with a setting of the display method setting unit.

According to the aspect of the present invention, in the music practice supporting appliance further includes: a display information switching unit for selecting which one of the input signal data stored in the first data memory unit and the input signal data stored in the second data memory unit is to be displayed; and a display data-memory unit for storing thereinto data which is to be displayed on the display unit. In the music practice supporting appliance, the display data memory unit can store thereinto the data based upon a content selected by the display information switching unit.

According to the aspect of the present invention, in the music practice supporting appliance, the display method setting unit can receive an input of the input signal data and can set a first piece of the input signal data inputted first as a predetermined value of a range to be displayed. Preferably, the above-mentioned predetermined value is a center value of the range.

According to the aspect of the present invention, in the music practice supporting appliance, the display method setting unit can receive an input of the input signal data, and set a minimum value and a maximum value of the input signal data as a lower limit and an upper limit of a range to be displayed, respectively.

According to the aspect of the present invention, in the music practice supporting appliance, the signal input unit can include: a vibration sensor for converting a vibration into the electric signal; and a fixing unit for fixing the signal input unit to the music practice supporting appliance.

According to the aspect of the present invention, in the music practice supporting appliance, the waveform processing unit can include: a waveform shaping unit for converting a waveform of the amplified input signal into the rectangular wave; and a musical interval detecting unit for acquiring a frequency of a musical sound from the shaped input signal data and detecting musical interval information from the acquired frequency.

According to the aspect of the present invention, in the music practice supporting appliance, the waveform processing unit includes: a waveform shaping unit for converting a waveform of the amplified input signal into the rectangular wave; and a musical interval detecting unit for acquiring a frequency of a musical sound from the shaped input signal data and detecting musical interval information from the acquired frequency. In the music practice supporting appliance, the display method setting unit can set of a center musical interval and a range, display the musical interval information on the display unit, display the center musical interval at a predetermined position of the screen along a direction of the ordinate, display deviation from the center musical interval along the direction of the ordinate, and display an elapse of time along a direction of the abscissa.

According to the aspect of the present invention, in the music practice supporting appliance, the waveform processing unit can include: a sample-and-hold unit for detecting a level of the input signal amplified by the input signal amplifying unit, and a hold time setting unit for setting an output holding time period of the sample-and-hold unit, and the input signal data can be sound volume information of the input signal.

According to the aspect of the present invention, in the music practice supporting appliance, the waveform processing unit can include: a sample-and-hold unit for detecting a level of the input signal amplified by the input signal amplifying unit; and a hold time setting unit for setting an output holding time period of the sample-and-hold unit; the input signal data can be sound volume information of the input signal; and the display method setting unit can include settings of a center sound volume and a range, display the sound volume information on the display unit, display the center sound volume at a predetermined position of the screen along a direction of the ordinate, display deviation from the center sound volume along the direction of the ordinate, and display an elapse of time along a direction of the abscissa.

According to the aspect of the present invention, in the music practice supporting appliance, the waveform processing unit can include: a sample-and-hold unit for detecting a level of the input signal amplified by the input signal amplifying unit; and a hold time setting unit for setting an output holding time period of the sample-and-hold unit; the input signal data can be sound volume information of the input signal; the display method setting unit can include settings of a center sound volume and a range, displays the sound volume information on the display unit, display the center sound volume at a predetermined position of the screen along a direction of the ordinate, display deviation from the center sound volume along the direction of the ordinate, and display an elapse of time along a direction of the abscissa; and the display method setting unit can set a layout with respect to displays of both the musical interval information and sound volume information.

According to the present invention, the deviation between the musical interval of the predetermined target sound and the musical interval of the inputted sound and the deviation between the sound volume of the predetermined target sound and the sound volume of the inputted sound are displayed in accordance with the elapse of time, which can be easily grasped. Also, the deviation of the musical intervals and the sound volumes from the target sound or the changes in the musical intervals and the sound volumes within predetermined time period are displayed. By having the user view the display content, the user can easily play music and produce sounds in correspondence with the target sounds, resulting in effective music practices.

BRIEF DESCRIPTION OF THE DRAWINGS

In the accompanying drawings:

FIG. 2 is a conceptional diagram for showing a table of storage contents of a first data memory unit 14 and a second data memory unit 15 of FIG. 1;

FIG. 20 represents a setting data list.

DETAILED DESCRIPTION OF THE PREFERRED EMBODIMENTS

Figure 1:
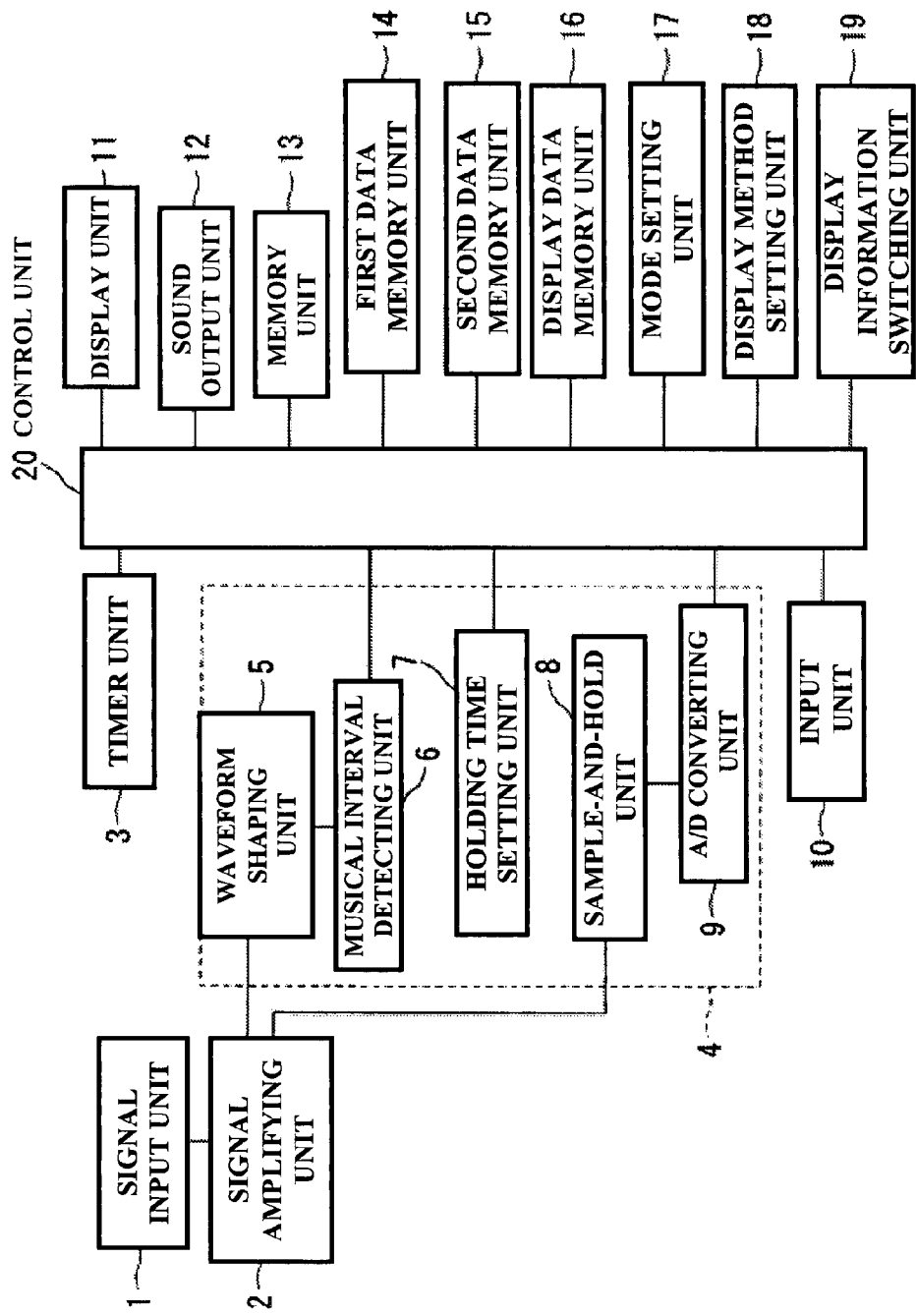
FIG. 1 is a block diagram for indicating a structural example of a music practice supporting apparatus according to a first embodiment of the present invention.

Referring to the drawings, embodiments of the present invention will be described.

FIG. 1 is a schematic block diagram for showing a music practice supporting appliance according to a first embodiment of the present invention.

A signal input unit 1 receives an input of sounds of musical instruments and converts the inputted sounds into electric signals. The signal input unit 1 may employ, for example, a microphone, a piezoelectric element, and a vibration sensor, which convert mechanical vibrations into electric signals.

However, output signals derived from a microphone, a piezoelectric element, a vibration sensor, and the like are extremely small, and therefore need to be amplified. A signal amplifying unit 2 amplifies an input signal inputted to the signal input unit 1, and then, outputs the amplified input signal to a waveform shaping unit 5 and a sample-and-hold unit 8. The signal amplifying unit 2 converts the input signal inputted through the signal input unit 1 into such a signal having a voltage level suitable to be processed in the waveform shaping unit 5 and the sample-and-hold unit 8.

A timer unit 3 produces a reference signal, a control timing signal employed in a control unit 20, and a timing signal employed in respective memory units and a signal processing unit 4.

The signal processing unit 4 surrounded by a broken line in the drawing converts the input signal amplified by the signal amplifying unit 2 into a signal which can be digitally processed. The signal processing unit 4 includes two processing units, that is, the waveform shaping unit 5 and the sample-and-hold unit 8, which process musical intervals and sound volumes of the input signals, respectively. The waveform shaping unit 5 receives an input signal from the signal amplifying unit 2 and shapes a waveform of this input signal, and then, outputs the shaped input signal as a rectangular wave. In the waveform shaping operation, for instance, a comparator compares an input signal with a preset value; and when a level of an input signal is higher than this preset value, the comparator defines the input signal as an "H" level and outputs a rectangular wave indicating the input signal, whereas when a level of an input signal is lower than this preset value, the comparator defines the input signal as an "L" level and outputs a rectangular wave indicating the input signal. As one example, the above-mentioned preset value employed in the comparator is set as a central voltage of an analog waveform substantially corresponding to the input signal. In other words, an analog mode signal is outputted from the signal amplifying unit 2, but the signal is shaped as a digital mode signal waveform, that is, a rectangular wave (pulse) signal which is indicated by the "H" level and the "L" level. A musical interval detecting unit 6 detects a musical interval from the input signal data shaped by the waveform shaping unit 5. The musical interval detecting unit 6 detects a periodic characteristic of a rectangular wave stream, acquires a fundamental frequency of the input signal based upon a repetition frequency of this rectangular wave stream, extracts a musical interval corresponding to the fundamental frequency from a built-in musical interval table in order to judge that this acquired fundamental frequency is coincident with which musical interval, and then, outputs the extracted result to the control unit 20 as musical interval information. In this case, musical intervals and frequency ranges corresponding to the respective musical intervals have been stored in the musical instrument table in correspondence with each other. When the rectangular wave of the input signal is inputted to the musical interval detecting unit 6 from the waveform shaping unit 5, the musical interval detecting unit 6 acquires a frequency of this rectangular wave to extract such a musical interval corresponding to a frequency range from the above-mentioned musical interval table, and then, outputs the extracted musical interval as musical interval information, while the acquired frequency is covered by this frequency range.

The sample-and-hold unit 8 receives the input signal from the signal amplifying unit 2 and detects a value of the input signal every predetermined time set in a holding time setting unit 7, and then, outputs this detected value to an A/D converting unit 9. In this case, the predetermined time has been previously set in the holding time setting unit 7 by being inputted thereinto by a user or the like. The sample-and-hold unit 8 holds the detected value of the input signal for the time set in the holding time setting unit 7, and then, outputs this held detected value. Then, the sample-and-hold unit 8 stores the values of the input signal every predetermined time period into a memory, and whereby the sample-and-hold unit 8 stores sound volume information which corresponds to a level value of an input signal in the unit of a predetermined time.

The A/D converting unit 9 receives a value detected by the sample-and-hold unit 8 to perform an A/D converting process operation for converting the inputted value into a digital value. Then, the A/D converting unit 9 outputs the converted input signal to the control unit 20 as sound volume information.

An input unit 10 includes keys which are used to input set values and to select display contents and modes of the music practice supporting appliance of this embodiment. The input unit 10 also includes an external input terminal, so that an input signal may be alternatively inputted from this external input terminal instead of the signal input unit 1.

The above-mentioned control unit. 20 controls operations of overall circuits employed in the music practice supporting appliance. In this case, the control unit 20 performs calculating operations and manages and controls operations of the respective units provided in the music practice supporting appliance so as to control the entire operations of this music practice supporting appliance in accordance with programs stored in, for example, a memory unit 13. While the control unit 20 includes a central processing unit (CPU), this CPU performs process operations in accordance with the programs stored in the memory unit 13. As a result, the CPU allows the control unit 20 to execute various sorts of control operations and various sorts of calculations. The memory unit 13 is constituted by a ROM, a RAM, and the like. In the ROM provided in the memory unit 13, a control program of the CPU and set values have been stored. As the ROM, a rewritable ROM such as a flash memory may be employed. The RAM provided in the memory unit 13 stores thereinto temporary data, set values, calculation results, data obtained during calculating operations, which are required in various sorts of process operations.

A display unit 11 displays thereon musical intervals and sound volumes of input signals. The display unit 11 is controlled by the control unit 20 so as to perform display operations in accordance with various sorts of setting conditions. A display screen of the display unit 11 is preferably made of either an LCD display or an electroluminescent (EL) display. Because an LCD display or an EL display is made compact and in light weight, an easily portable music practice supporting appliance may be constructed. A sound output unit 12 outputs a sound serving as a reference. For instance, sounds are outputted through a speaker. Also, the sound output unit 12 is equipped with an output-purpose jack, so that the sound output unit 12 may be connected to an external appliance.

A first data memory unit 14 corresponds to a readable/writable memory, for instance, a RAM. Alternatively, a readable/writable non-volatile memory such as a flash memory may be employed as the first data memory unit 14. The first data memory unit 14 is controlled by the control unit 20. Both musical interval information and sound volume information of an input signal are stored in the first data memory unit 14 under control of the control unit 20 every predetermined time passes. Also, a range and a central value which are to be displayed on the display screen are stored as auxiliary data in the first data memory unit 14 under control of the control unit 20. Also, input data for each file is stored in the first data memory unit 14. Every time both musical interval information and sound volume information of an input signal are inputted, those musical interval information and sound volume information are written in the first data memory unit 14 under control of the control unit 20 to be stored thereinto. In the case where information (data) having such an amount which exceeds the storage capacity of the first data memory unit 14 is inputted to the first data memory unit 14, the control unit 20 transfers data having such an amount as to allow the storing of the new data to a second data memory unit 15 in the order of storage of data. Also, the control unit 20 writes newly inputted data into an empty storage area of the first data memory unit 14 obtained by transferring the data as described above. As to the memory capacity, the first data memory 14 has been set based upon such a storage capacity in which a data amount corresponding to a data amount of one screen can be preferably stored. In the case where data which exceed the set storage capacity are inputted, the inputted data are separately saved using another storage means.

Also, while receiving anew input signal, the first data memory unit 14 stores data which have been so far stored thereinto in the second data memory unit 15 and saves the data of the new input signal.

Similar to the first data memory unit 14, the second data memory unit 15 corresponds to a readable/writable memory, for instance, a RAM. Alternatively, a flash memory may be employed as the second data memory unit 15. The second data memory unit 15 is controlled by the control unit 20. Both musical interval information and sound volume information of an input signal are stored in the second data memory unit 15 every predetermined time passes. Also, a range and a central value which are to be displayed may be stored as auxiliary data in the second data memory unit 15. Also, input data for each file is stored in the second data memory unit 15, and thereafter the input data can be read therefrom.

When information related to an input signal is displayed on the display unit 11 in real time, the control unit 20 reads out data to be displayed from the first data memory unit 14, and then, stores the read data into a display data memory unit 16. When the past data is displayed on the display unit 11, the control unit 20 reads out data from the second data memory unit 15, and then, stores the read data into the display data memory unit 16. A switching judgement of whether the data is displayed in real time, or the past data is displayed is made by a display information switching unit 19. In the display information switching unit 19, a selection is made of display information, and switching data information corresponding to the selected display information is stored, and then, the control unit 20 performs a control operation based upon the stored switching data information.

A mode setting unit 17 selects a mode to be displayed and past data to be displayed, and sets and selects an initial setting mode and the like in response to an input by the user, and then, this setting information is stored. Under the control of the control unit 20, the present setting condition is changed to this selected setting condition, or the setting condition is selected.

A display method setting unit 18 performs various sorts of setting operations in response to an input by the user, and then, stores the setting information. That is, the display method setting unit 18 sets a display of musical interval information, sets a display of sound volume information, sets a range of an ordinate, sets a scrolling speed, sets a range of an abscissa, and also sets a layout of the musical interval information and the sound volume information. The control unit 20 performs the control operation based upon the set information.

FIG. 2 is a diagram for indicating a content of a memory. In this memory table, an abscissa indicates a memory, a file, a time, musical interval data, sound volume data, and auxiliary data, whereas an ordinate shows a first data memory, and a second data memory.

The first data memory unit 14 stores thereinto contents of a row of the first data memory of a memory stream. As the file, a file F121 is stored in the first data memory unit 14. The file F121 includes: musical interval data DA3, sound volume data DB3, and auxiliary data DC3 in a time T3; musical interval data DA4, sound volume data DB4, and auxiliary data DC4 in a time T4; musical interval data, sound volume data, and auxiliary data similarly in each time; and up to musical interval data DAn, sound volume data DBn, and auxiliary data DCn in a time Tn.

The second data memory unit 15 stores thereinto contents of a row of the second data memory of the memory stream. Such data which exceeds the storage capacity of the first data memory unit 14 is stored as a file F122. The file F122 includes: musical interval data DA1, sound volume data DB1, and auxiliary data DC1 in a time T1; and musical interval data DA2, sound volume data DB2, and auxiliary data DC2 in a time T2. As described above, as to the file F1, the old data is stored in the second data memory unit 15, and the new data is stored in the first data memory unit 14, and when the input data exceeds the storage capacity, the old data is transferred to the second data memory unit 15 in order that a series of input data is not depleted. The data of the file F121 succeed the data of the file F122. The time T1 is stored as the oldest data, and the time Tn is stored as the latest data in a time sequence.

Also, with respect to the data, the inputting operation of which has already been accomplished, a time, musical data, sound volume data, and auxiliary data are stored for each file such as the file F2 or the file F3 and saved so as to be redisplayable later.

Figure 3:
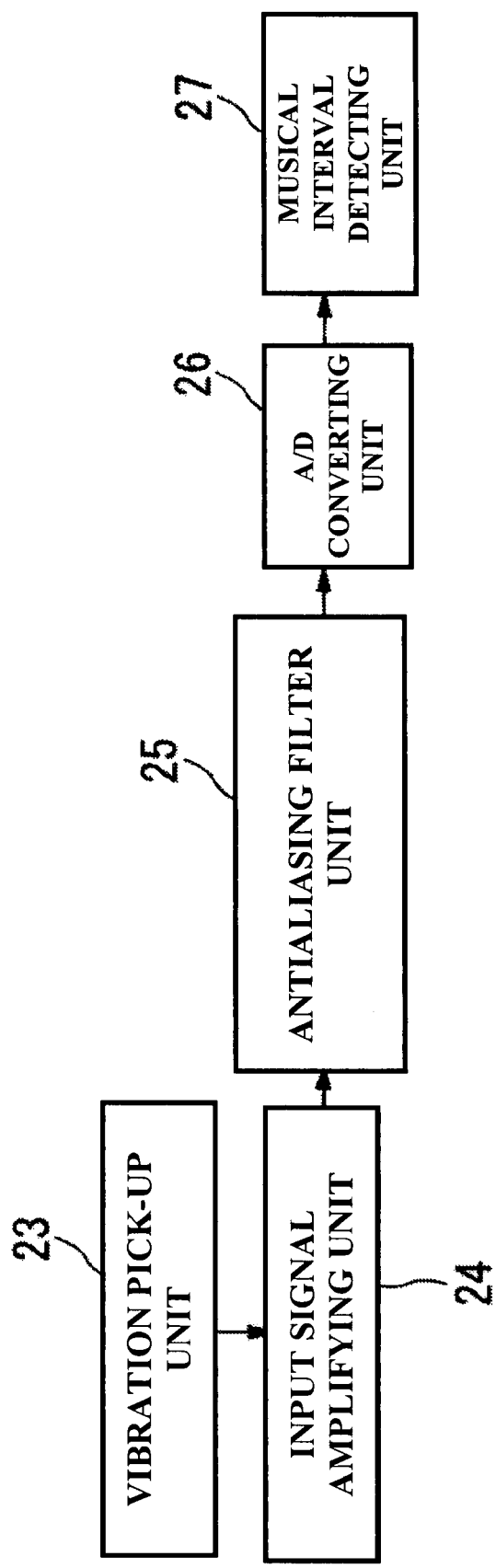
FIG. 3 is a block diagram for representing a structural example of a signal processing unit 4 according to a second embodiment of the present invention.

FIG. 3 is a block diagram for indicating a second embodiment of a signal processing unit of the present invention. A vibration pick-up unit 23 is mounted to a musical instrument, while a piezoelectric element is arranged in the vibration pick-up unit 23. In the vibration pick-up unit 23, the piezoelectric element converts vibrations produced when the musical instrument is played into electric signals in response to the vibrations, and then, outputs the electric signals. An input signal amplifying unit 24 amplifies an electric signal outputted from the vibration pick-up unit 23. The input signal amplifying unit 24 inputs the amplified signal to an antialiasing filter unit 25. In order that aliasing does not occur when an A/D converting operation is carried out, the amplified signal is filtered by an antialiasing filter of the antialiasing filter unit 25 before being A/D-converted. In other words, the filtering operation is carried out in order to remove signals having frequencies equal to or higher than the Nyquist frequency to eliminate aliasing noise. Thereafter, the filtered signal is inputted to an A/D converting unit 26. In the A/D converting unit 26, the analog signal is converted into a digital signal, and then, the digital signal is outputted to a musical interval detecting unit 27. The musical interval detecting unit 27 detects a musical interval, and than outputs the musical interval information to a subsequent stage. As previously described, before the A/D converting operation is carried out, the pre-process operation of the signal is carried out in order to prevent an error detection.

Figure 4:
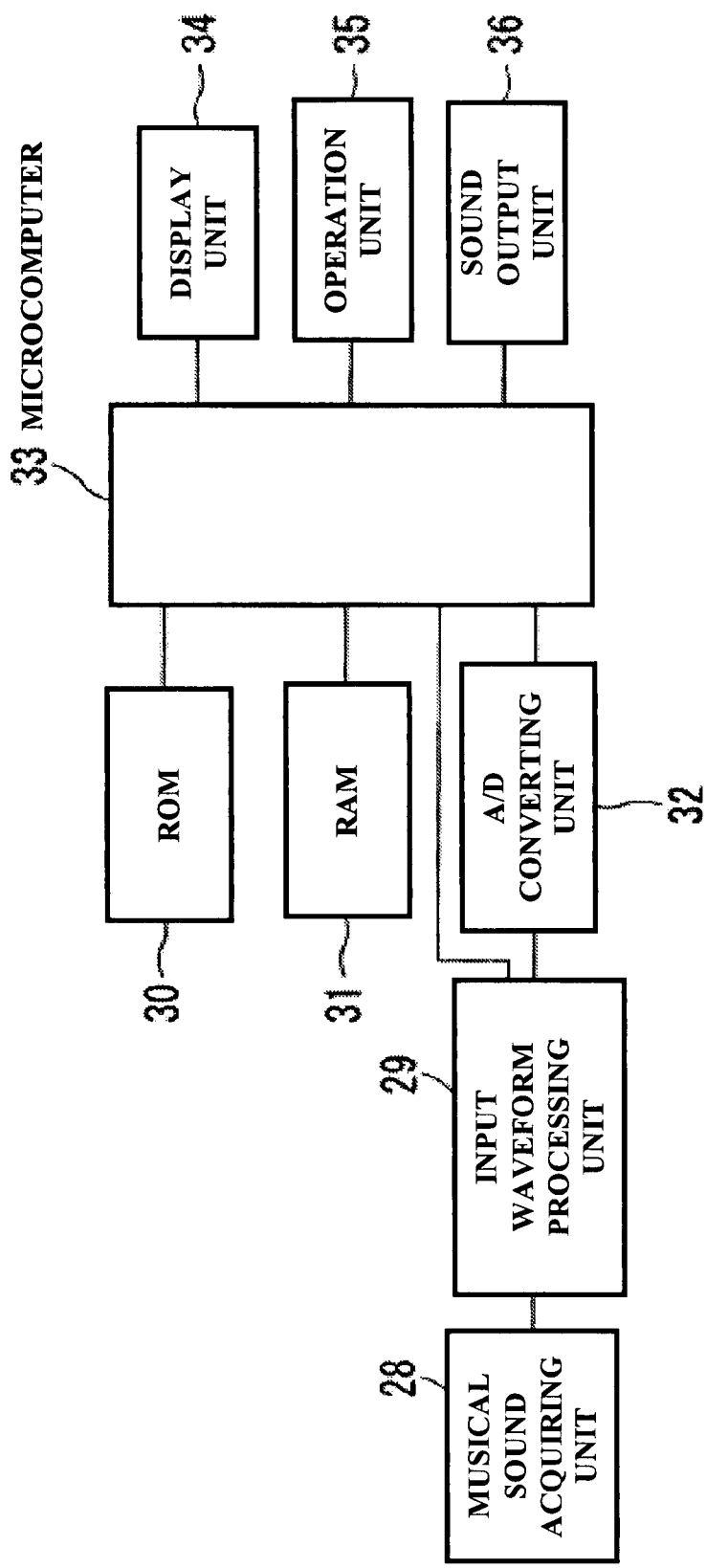
FIG. 4 is a block diagram for indicating a structural example of a music practice supporting apparatus according to a third embodiment of the present invention.

FIG. 4 is a block diagram for showing a third embodiment of the present invention. A musical sound acquiring unit 28 corresponds to a signal input unit, and receives sounds of a musical instrument so as to convert the inputted sounds into electric signals. A converted input signal is outputted to an input waveform processing unit 29. The input waveform processing unit 29 executes various signal process operations such as amplifying operation, waveform shaping operation, and antialiasing filtering operation with respect to the input signal, and then, outputs the processed signal to a microcomputer 33 and an A/D converting unit 32. The A/D converting unit 32 converts the analog signal into a digital signal, and outputs the converted data to the microcomputer 33. The microcomputer 33 controls overall operations of the music practice supporting appliance based upon programs previously stored in the ROM 30. The microcomputer 33 calculates a musical interval based upon a signal inputted through the input waveform processing unit 29. That is to say, the microcomputer 33 converts a signal, that is, corresponding to a function of time, inputted from the A/D converting unit 26 into such a signal corresponding to a function of a frequency so as to acquire a peak in the frequency range and acquire a reference frequency, that is, a musical interval.

In the ROM 30, a control program of the microcomputer 33 and set values are stored. As the ROM 30, a rewritable ROM such as a flash memory may be employed. The RAM 31 stores there into temporarily data, set values, calculation results, data obtained during calculating operations, which are required in various sorts of process operations.

A display unit 34 displays thereon a deviation of a musical interval and a sound volume of an input signal with respect to a musical interval and a sound volume of a reference, respectively. The display unit 34 is controlled by the microcomputer 33. Also, the display unit 34 displays thereon various sorts of setting conditions, an input instruction, and a message. A display screen of the display unit 34 is preferably made of either an LCD display or an EL display. Because an LCD display or an EL display is made compact and in light weight, an easily portable music practice supporting appliance can be constructed. A sound output unit 36 outputs a reference sound. The reference sound is a target sound, and a melody may be employed as the reference sound. Further, the control unit 20 performs a musical interval control operation and a sound volume control operation of a preset reference sound, and the set reference sound is outputted from a speaker of the sound output unit 36. The sound output unit 36 is equipped with a jack used for outputting via which the music practice supporting appliance can be connected to an external appliance. An operation unit 35 corresponds to keys through which set values of the music practice supporting appliance are inputted, and displays and modes thereof are switched. Also, the operation unit 35 is equipped with an external input terminal, and thus, the input signal can be inputted from this external input terminal instead of the musical sound acquiring unit 28. The third embodiment is realized by replacing the control unit 20 of the first embodiment shown in FIG. 1 by the microcomputer 33. As described above, the executions of the control unit 20 may be realized using the microcomputer 33.

Figure 5:
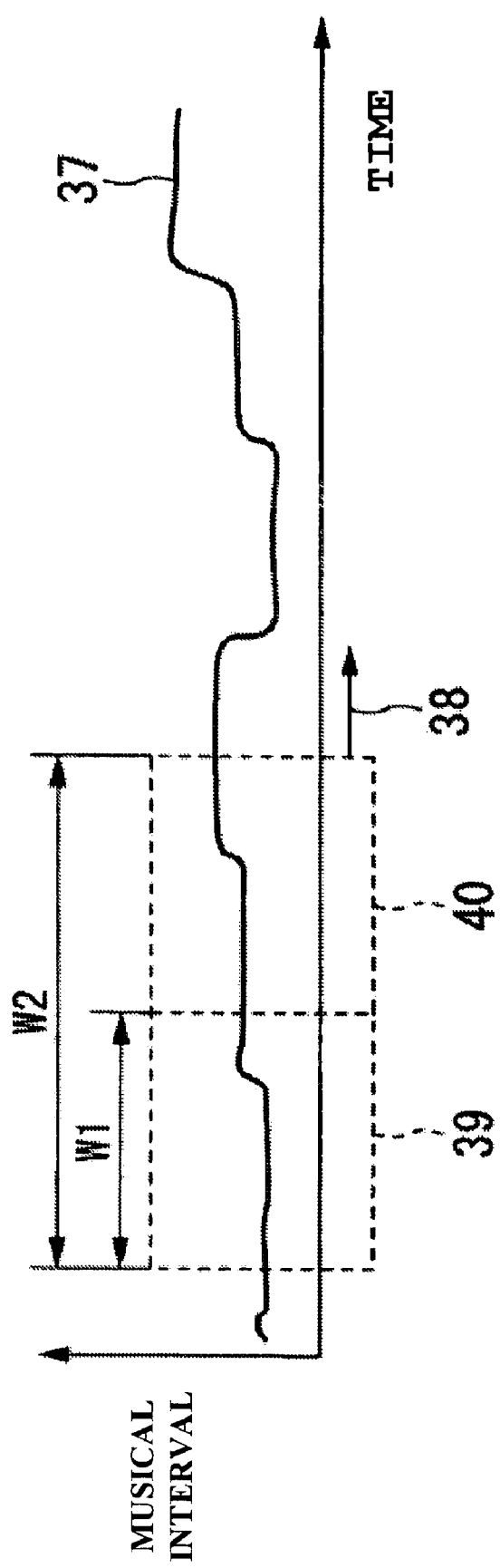
FIG. 5 is a diagram for graphically showing musical intervals according to the present invention.

FIG. 5 is a diagram for representing a musical interval display of the present invention. That is, FIG. 5 is a graph in which an abscissa indicates a time, and an ordinate indicates a musical interval. As to an input signal 37, a musical interval thereof is changed in accordance with a time elapse. The above-mentioned time elapse and a change in the musical intervals are stored in the second data memory unit 15. A first display area 39 surrounded by a broken line in the drawing shows data which is displayed on one screen. A time portion of W1 is displayed on one screen. A second display area 40 surrounded by a broken line in the drawing indicates that a time portion of W2 is displayed on one screen. The display method setting unit 18 sets time portion of data displayed on one screen as described above. Based upon this setting method, the data is displayed on one screen of the display unit 11 by changing the display time. If the display time becomes longer, then a coarser content is displayed. Also, a change arrow 38 indicates a speed of movement. The change arrow 38 shows that a scrolling operation is carried out by a length of the arrow per unit time. This scrolling speed is also set in the display method setting unit 18. Based upon this setting condition, the display unit 11 displays data by changing the scrolling speed.

Figure 6:
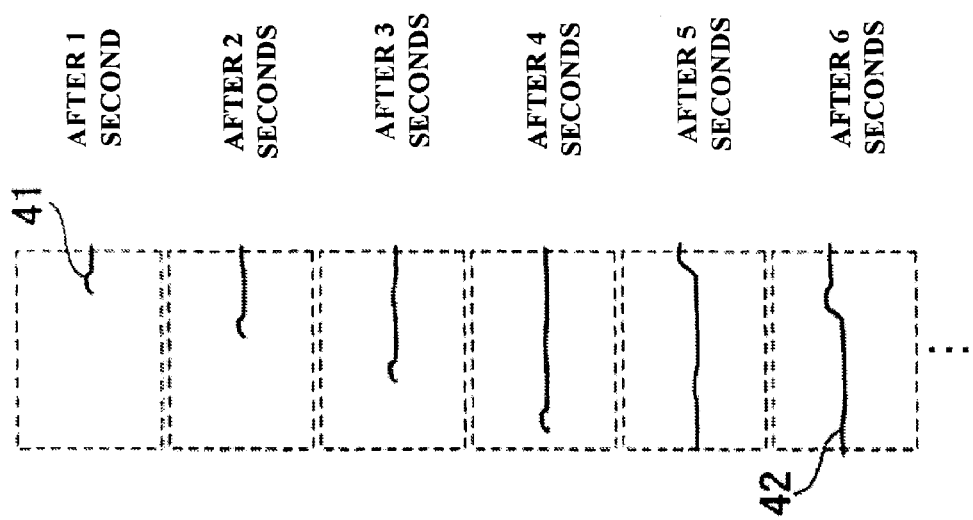
FIG. 6 is a diagram for representing a role display mode according to the present invention.

FIG. 6 is a diagram for indicating a roll display mode of the present invention. The diagram indicates that a time elapses second by second after a signal is inputted into the signal input unit 1 and a process operation is commenced from an upper portion of the drawing. A musical interval line 41 is such a line which shows a musical interval changes in accordance with an elapse of time. A portion surrounded by a dotted line shows a screen. The musical interval line 41 is displayed from a right edge of the screen. The musical interval line 41 is displayed at the same speed per second. During the time elapse of 4 seconds, the musical interval line 41 is reached from the right edge to a left edge of the screen. Such a display is made that newest data continuously appears from the right edge, and older data is advanced along the leftward direction. After 5 seconds have passed, the first data reaches the left edge and then disappears from the screen. The data being displayed corresponds to such a data which is stored in the first data memory unit 14, and the signal which disappeared at a left edge 42 of the screen after 6 seconds is saved in the second data memory unit 15.

Figure 7:
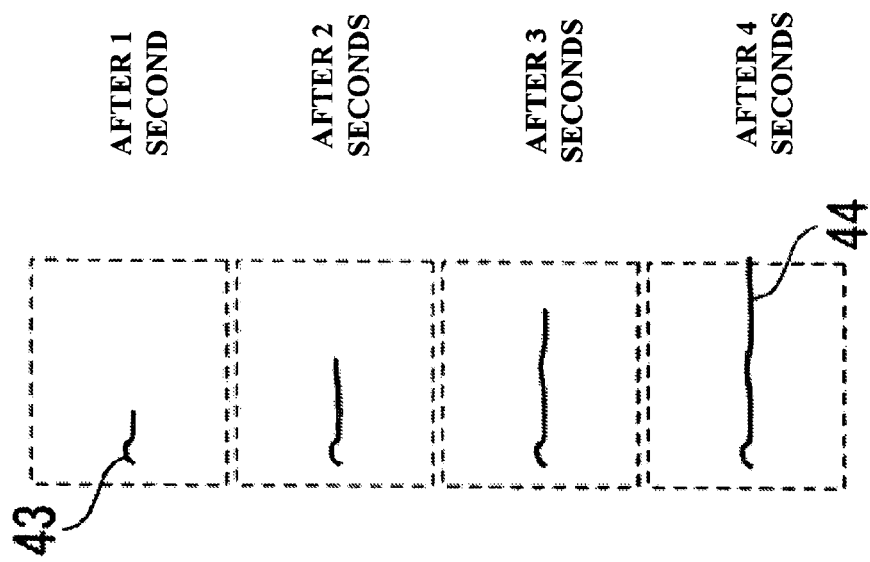
FIG. 7 is a diagram for representing a single display mode according to the present invention.

FIG. 7 is a diagram for indicating a single display mode of the present invention. In this single display mode, when data components corresponding to data which are displayed on one screen are inputted, the data input is stopped. In the case of this single display mode, a display of deviation is commenced from a left edge 43 of a screen. The display operation is carried out at the same time when the signal is inputted. During the time elapse of 4 seconds, a musical interval line is displayed from left to right on the screen. After 4 seconds have passed, a display of one screen is just completed at a right edge 44. When the display of one screen is completed, the input of the signal is stopped.

Figure 8:
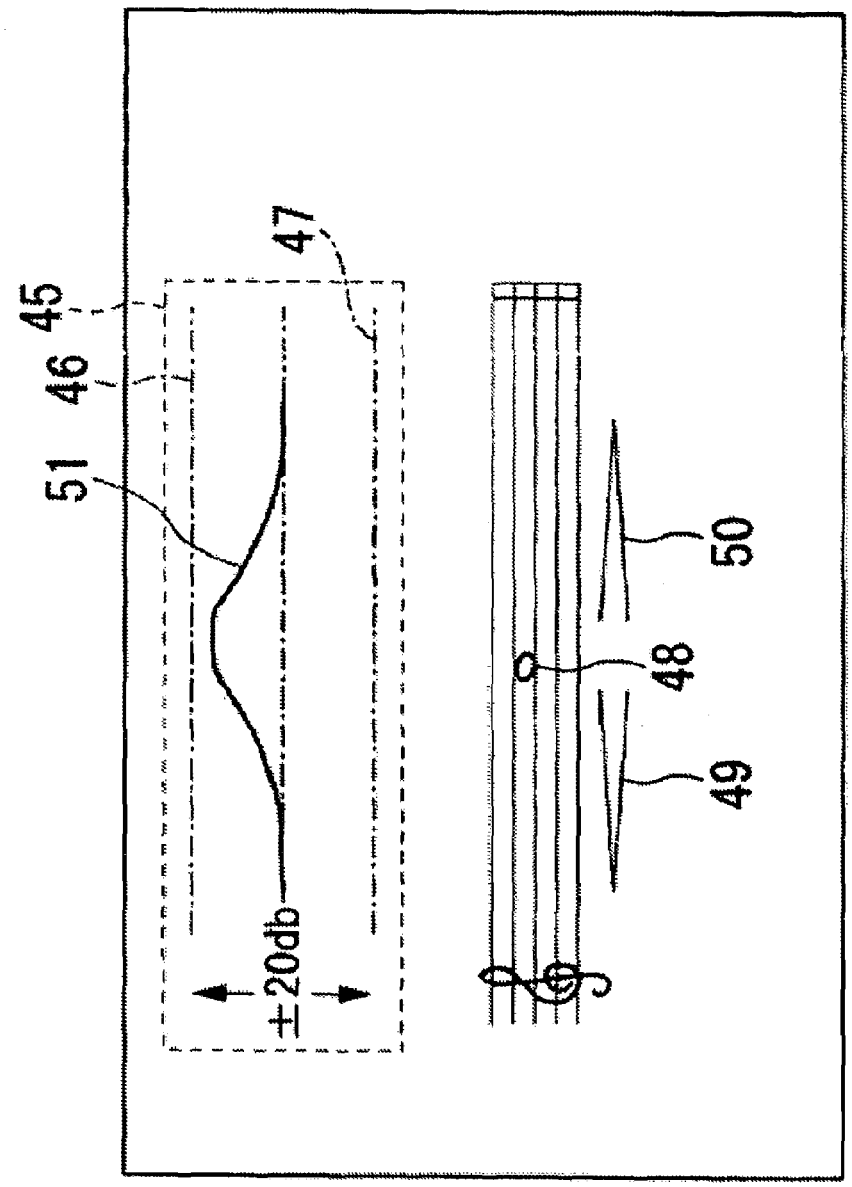
FIG. 8 is a diagram for showing a first display mode according to the present invention.

FIG. 8 is a diagram for indicating a first display mode. In the first display mode, a graph for indicating a change in sound volumes is shown in an upper portion of the display screen, and a musical score of music practiced is indicated in a lower portion of the display screen. Alternatively, it is also possible to perform selecting of the display screen, and only a sound volume change graph 45 in the upper portion may be displayed. An upper range line 46 corresponds to such a line which indicates a position of +20 db with respect to the reference sound volume. A lower range line 47 corresponds to such a line which indicates a position of −20 db with respect to the reference sound volume. A sound volume line 51 corresponds to such a line which indicates a time change in sound volumes of an inputted sound. A musical score of music practiced is displayed in the lower portion. This musical score serves as a practice-purpose musical score indicating that after a whole note 48 of a "c" sound is started to be played, the sound volume is gradually increased as represented by a crescendo 49, once kept as a target sound volume, and then gradually decreased as represented by a decrescendo 50. On the sound volume change graph 45, the sound volume line 51 indicative of the sound volume of the inputted sound is displayed. The sound volume line 51 displays that the sound volume is gradually increased, the increased sound volume is kept constant, and then, the sound volume is gradually decreased. A sound volume of an inputted sound can be recognized with respect to the above-mentioned sound volume change display. Since a musical score is previously set, the musical score and a deviation between the inputted sound volume and the display of the musical score can be displayed.

Figure 9:
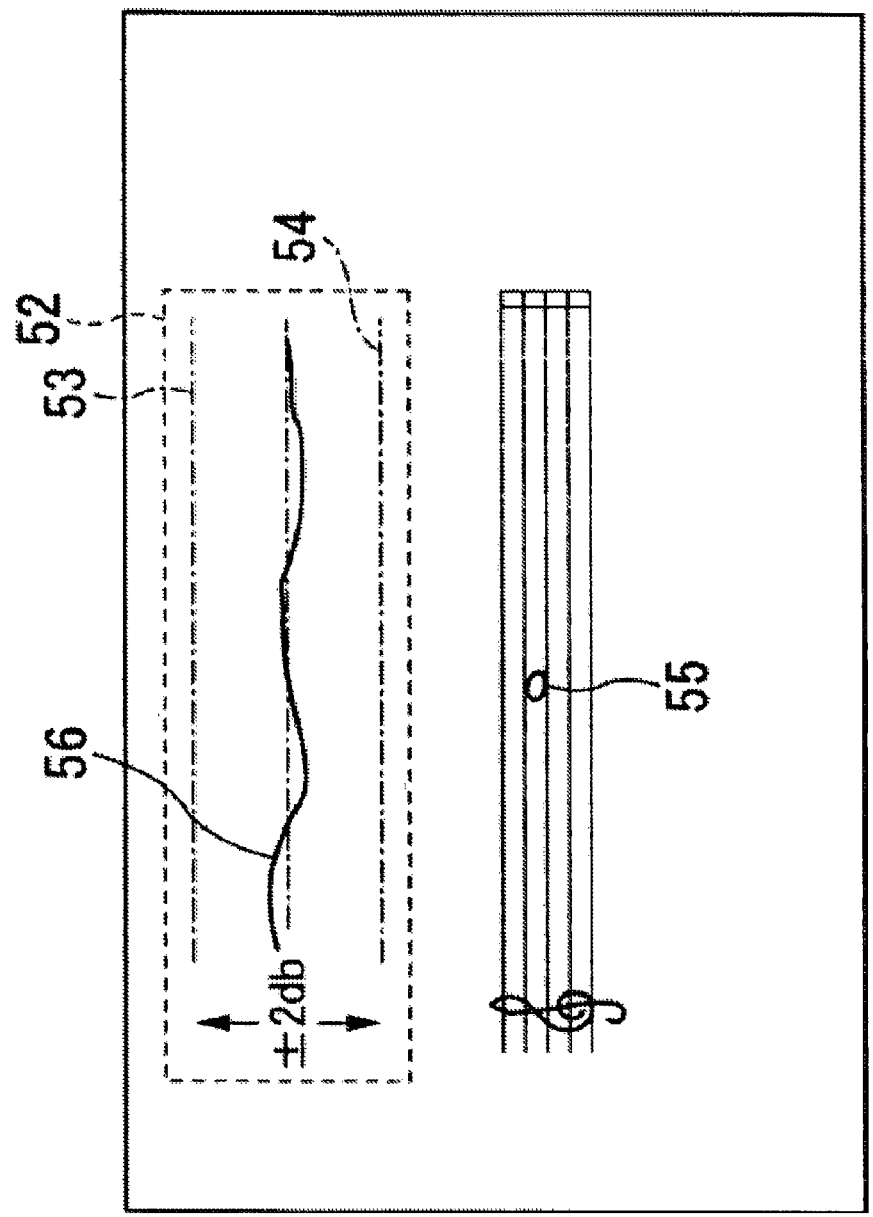
FIG. 9 is a diagram for indicating a second display mode according to the present invention.

FIG. 9 is a diagram for indicating a second display mode. In the second display mode, a graph for indicating a change in sound volumes is shown in an upper portion of the display screen, and a musical score of music practiced is indicated in a lower portion of the display screen. Alternatively, it is also possible to set that the display screen is selected, and only a sound volume change graph 52 in the upper portion may be displayed. An upper range line 53 corresponds to such a line which indicates a position of +2 db with respect to the reference sound volume. A lower range line 54 corresponds to such a line which indicates a position of −2 db with respect to the reference sound volume. A dot and dash line located at an intermediate position between the upper range line 53 and the lower range line 54 indicates a sound volume which constitutes a reference. A sound volume line 56 corresponds to such a line which indicates a time change in sound volumes of an inputted sound. A musical score of music practiced is displayed in the lower portion. This musical score serves as a practice-purpose musical score indicating that a sound volume of a whole note 55 of a "c" sound is kept constant. On the sound volume change display 52, as shown by the sound volume line 56, it can be seen that the sound volume is kept while the reference sound volume is set as a center. While viewing the change of this sound volume line 56, a user practices to keep the sound volume constant.

Figure 10:
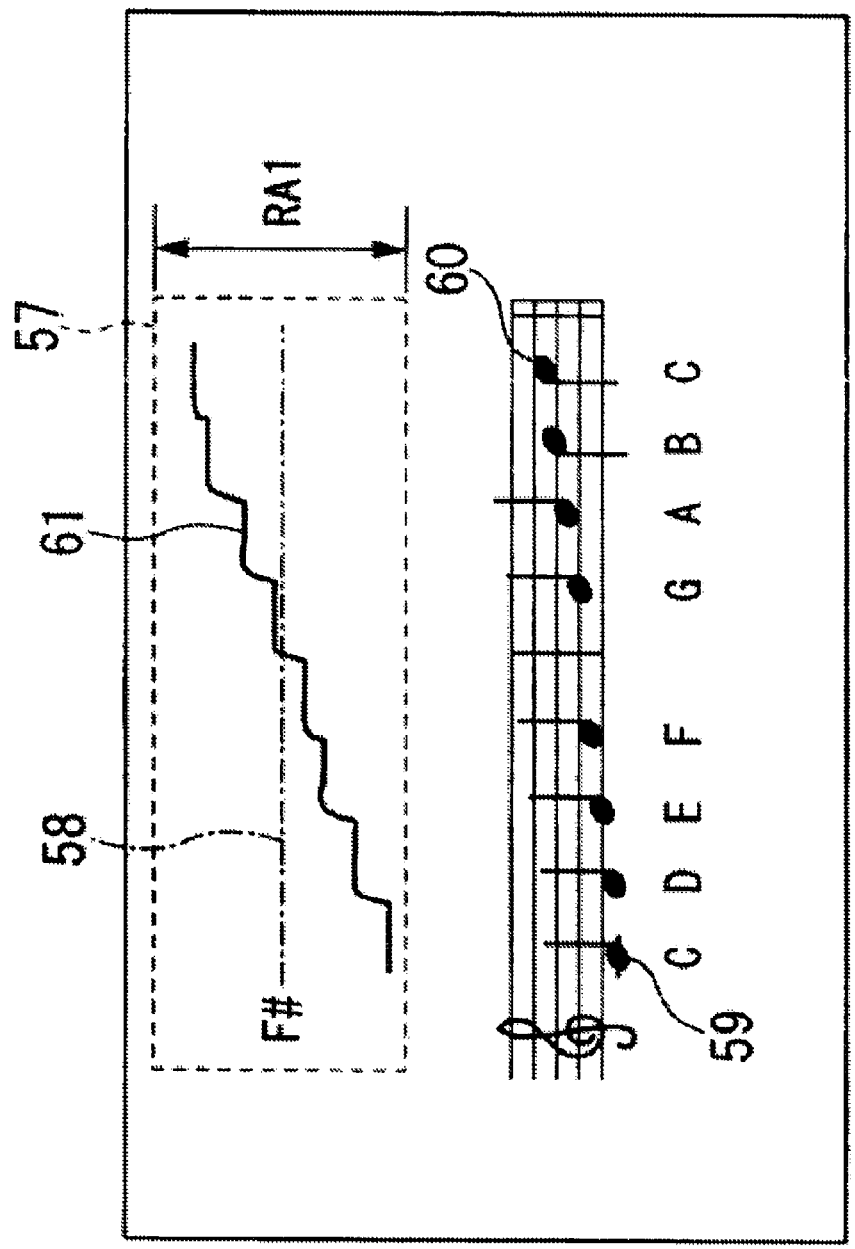
FIG. 10 is a diagram for showing a third display mode according to the present invention.

FIG. 10 is a diagram for indicating a third display mode. In the third display mode, a graph for indicating a change in musical intervals is shown in an upper portion of the display screen, and a musical score of music practiced is indicated in a lower portion of the display screen. Alternatively, it is also possible to select the display screen, and only a musical interval change graph 57 in the upper portion may be displayed. A range width RA1 displays a preset range of 1 octave from a sound C 59 up to a sound C 60 above C 59 by 1 octave, while a center musical interval line F# 58 is set as a center. A musical interval line 61 represents a change in musical intervals when sounds from C 59, via D, E, F, G, A, and B, up to C 60 are played.

Figure 11:
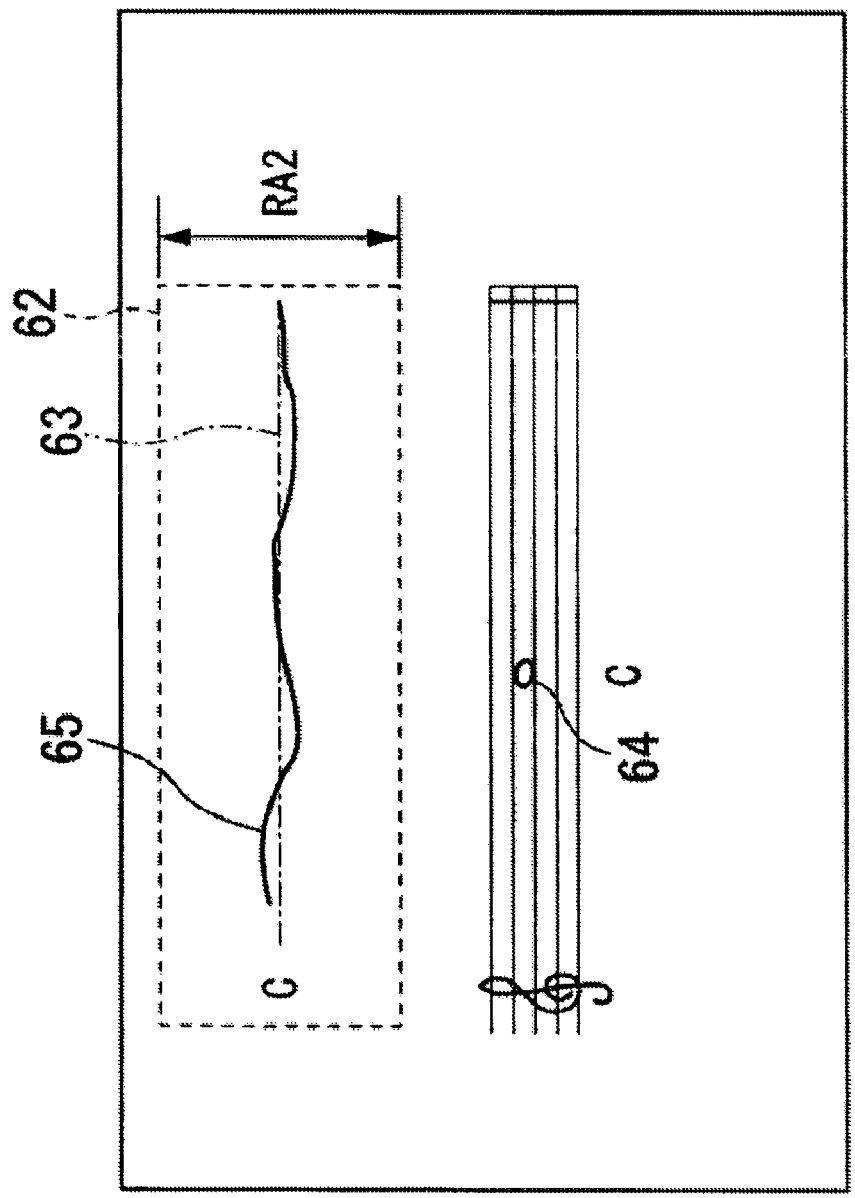
FIG. 11 is a diagram for indicating a fourth display mode according to the present invention.

FIG. 11 is a diagram for indicating a fourth display mode. In the fourth display mode, a graph for indicating a change in musical intervals is shown in an upper portion of the display screen, and a musical score of music practiced is indicated in a lower portion of the display screen. Alternatively, it is also possible to select the display screen, and only a musical interval change graph 62 in the upper portion may be displayed. While a center musical interval line 63 is set as a center, the display operation is performed in a range width RA2. This range width RA2 represents deviation from a musical interval. A musical interval line 65 shows a change in musical intervals when a sound C 64 is played. Accordingly, a user can practice music so that the musical interval line 65 is overlapped with the center musical interval line 63.

Figure 12:
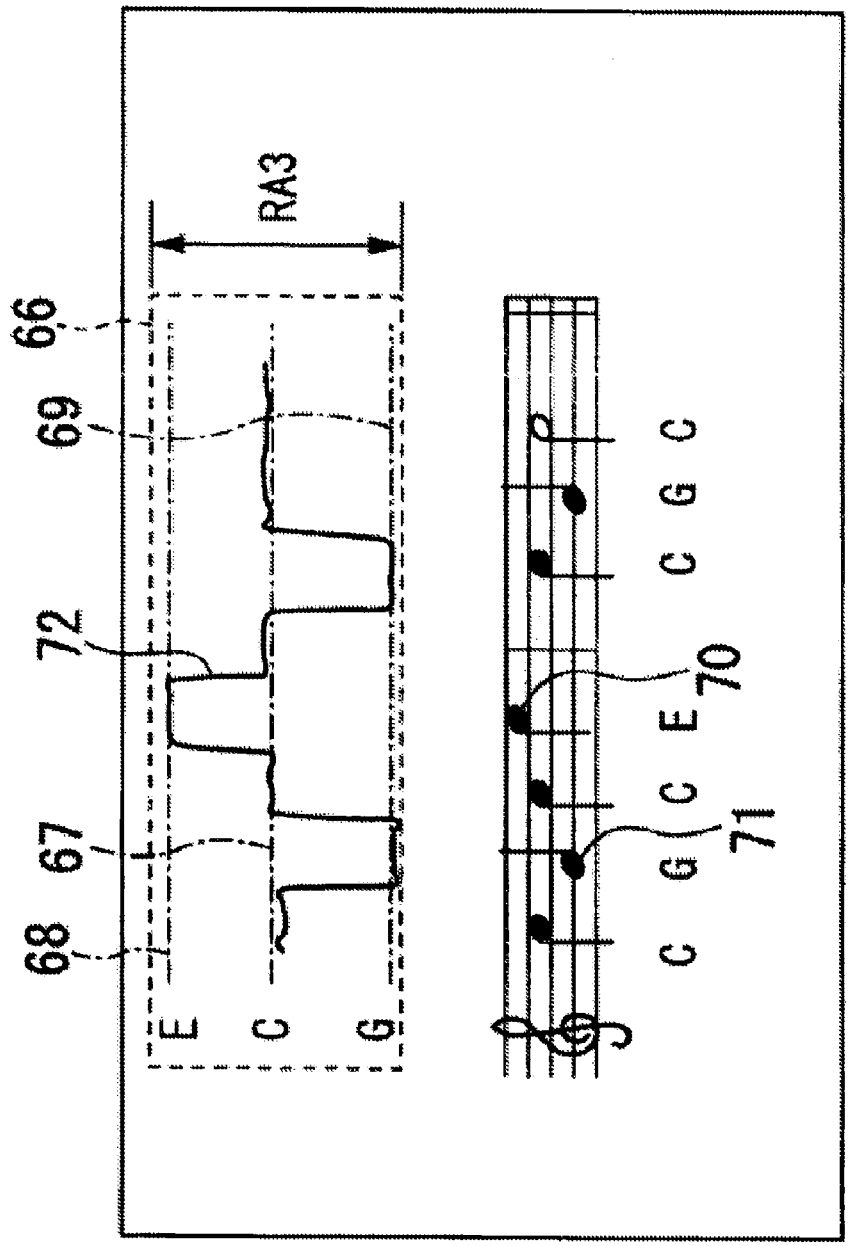
FIG. 12 is a diagram for showing a fifth display mode according to the present invention; .

FIG. 12 is a diagram for indicating a fifth display mode. In the fifth display mode, a graph for indicating a change in musical intervals is shown in an upper portion of the display screen, and a musical score of music practiced is indicated in a lower portion of the display screen. Alternatively, it is also possible to select. the display screen, and only a musical interval change graph 66 in the upper portion may be displayed. A range width RA3 displays a width from a G 71 sound up to a E 70 sound. An upper range line 68 indicates a musical interval of an E sound, whereas a lower range line 69 shows a musical interval of G sound. A center musical interval line 67 corresponds to a musical interval of a C sound. A musical interval line 72 corresponds to such a line which indicates a time change in musical intervals. It can be seen that the musical interval line 72 is also changed in accordance with playing of musical notes in a musical score. At this time, the user practices music in such a manner that the musical interval line 72 shows musical intervals of played sounds may be coincident with the center musical interval line 67, the upper range line 68, and the lower range line 69, showing target sounds of the music score as close as possible. Accordingly, the user can practice playing the musical intervals which are faithful to the musical intervals shown in the musical score.

Figure 13:
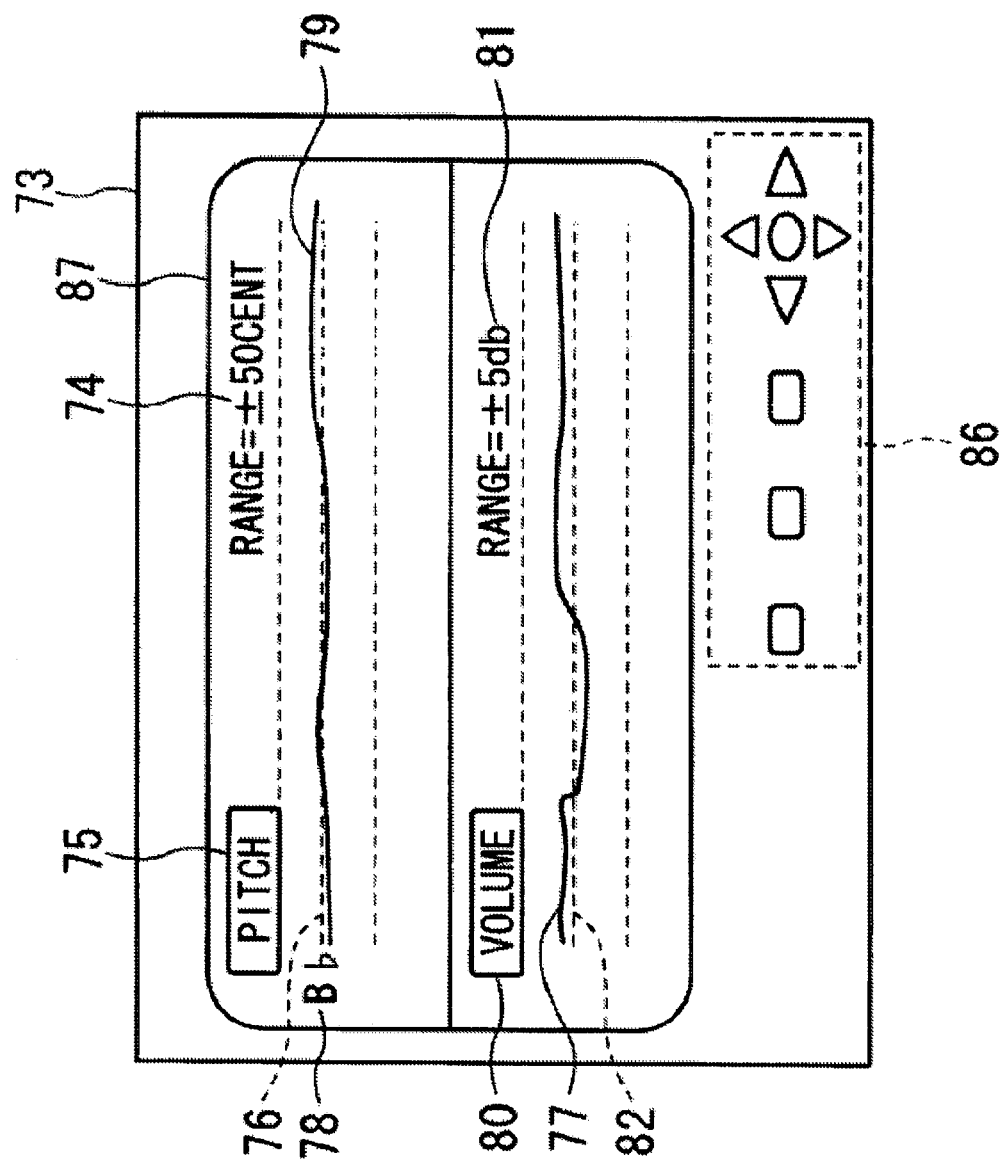
FIG. 13 is a diagram for indicating a sixth display mode according to the present invention.

FIG. 13 is a diagram for indicating a sixth display mode. That is, FIG. 13 is a view for showing the music practice supporting appliance, as viewed from front.

A front plane 73 of the music practice supporting appliance includes a display 87 and an input unit 86. Buttons located in a lower right portion and surrounded by a dotted line corresponds to the input unit 86 for operating the appliance and for inputting/setting various values. In the display 87, an upper portion shows a graph for indicating a time elapse of deviation of a musical interval, whereas a lower portion indicates a change in sound volumes. A PITCH mark 75 is a mark indicative of a musical interval. What item the graph indicates is displayed here in correspondence with such a setting condition that what item is displayed in the upper portion carried out in the display method setting unit 18. A VOLUME mark 80 corresponds to a mark indicative of a sound volume. What item the graph indicates is displayed here in correspondence with such a setting condition that what item is displayed in the lower portion carried out in the display method setting unit 18.

An upper range 74 shows a range of a musical interval display. The upper range 74 indicates that the range has plus and minus 50 cents. A lower range 81 shows a range of a sound volume display. The lower range 81 indicates that the range has plus and minus 50 db. An upper portion center line 76 represents a musical interval which constitutes a reference. A musical interval 79 shows a musical interval of an inputted sound. A distance from the upper portion center line 76 indicates a shift of a musical interval. A B flat 78 shows such a musical interval which constitutes a reference. In this example, a B flat corresponds to a reference. Such a condition that when a sound is continuously produced, a distance shifted from the reference is displayed in accordance with a time elapse, which can be viewed. A lower portion center line 82 shows a reference of a sound volume. A sound volume line 77 shows a sound volume of an inputted sound.

The music practice supporting appliance having the front plane 73 as structured above can be employed while practicing music to keep musical intervals and sound volumes of sounds produced through a musical instrument constant and stable for a long time.

A description is made of contents of the display method setting unit 18 with-reference to a setting data table of FIG. 20. This setting table corresponds to a setting table for the sixth display mode of FIG. 13. The setting table has items and setting values corresponding to those items. An item of "display area" is an item related to a layout on the display screen. In this layout item, how to divide the display screen and how to arrange the divided screen are as a reset. The setting values correspond to 2 and vertical. The setting-value of "2" indicates that the screen is divided into 2. The setting value of "vertical" indicates that the divided screens are arranged vertically. As to "display area size", sizes of the respective screens are set based upon a percentage. Both the upper portion and the lower portion are equal to 50% respectively, so that the screen is divided into an upper half screen and a lower half screen. "Content of display area" indicates that what item is displayed on each of the display areas. The upper portion shows a musical interval, and the lower portion indicates a sound volume. A musical note, a message, and the like may be alternatively set to be displayed.

"Reference sound" indicates what item is employed and displayed as a reference. The upper portion is a B flat and the lower portion is an initial sound. In the upper portion, the B flat sound is employed as the reference. A calculation is made of deviation between an inputted sound and a B flat sound, and then, the calculated deviation is displayed. In the lower portion, a volume of a sound which is firstly inputted is used as a reference.

"Ordinate unit" indicates that what item is displayed in an ordinate. An upper portion corresponds to deviation, and indicates deviation with respect to a reference sound. A lower portion corresponds to a volume, and shows a difference between the reference volume and the volume.

"Ordinate range" indicates a range width of the ordinate. A range width of the upper portion is plus and minus 50 cents, whereas a range width of the lower portion is plus and minus 6 dB.

"Abscissa unit" indicates that what item is displayed on an abscissa. An abscissa of the upper portion corresponds to time. An abscissa of the lower portion corresponds to time.

"Abscissa range" indicates a range width of the abscissa. An abscissa range of the upper portion is 10 seconds and an abscissa range of the lower portion is also 10 seconds. The ranges which are displayed on one screen correspond to data for 10 seconds respectively.

"Moving speed" indicates the speed that the screen moves. A moving speed of the upper portion is 10 seconds/screen and a moving speed of the lower portion is also 10 seconds/screen. That is, a displayed item moves so as to move within one screen in 10 seconds.

"Display mode" indicates a mode to be displayed. An upper portion employs a role mode, and a lower portion also employs a role mode. A display operation is continued while a displayed item is moved within one screen in 10 seconds.

While the above-mentioned setting operations are carried out in the display method setting unit 18, the sixth display mode is displayed as to the inputted sound under control of the control unit 20. By changing the setting contents, various display modes can be achieved. For example, the above-mentioned first to fifth display modes, and also, the following display modes can be displayed.

Figure 14:
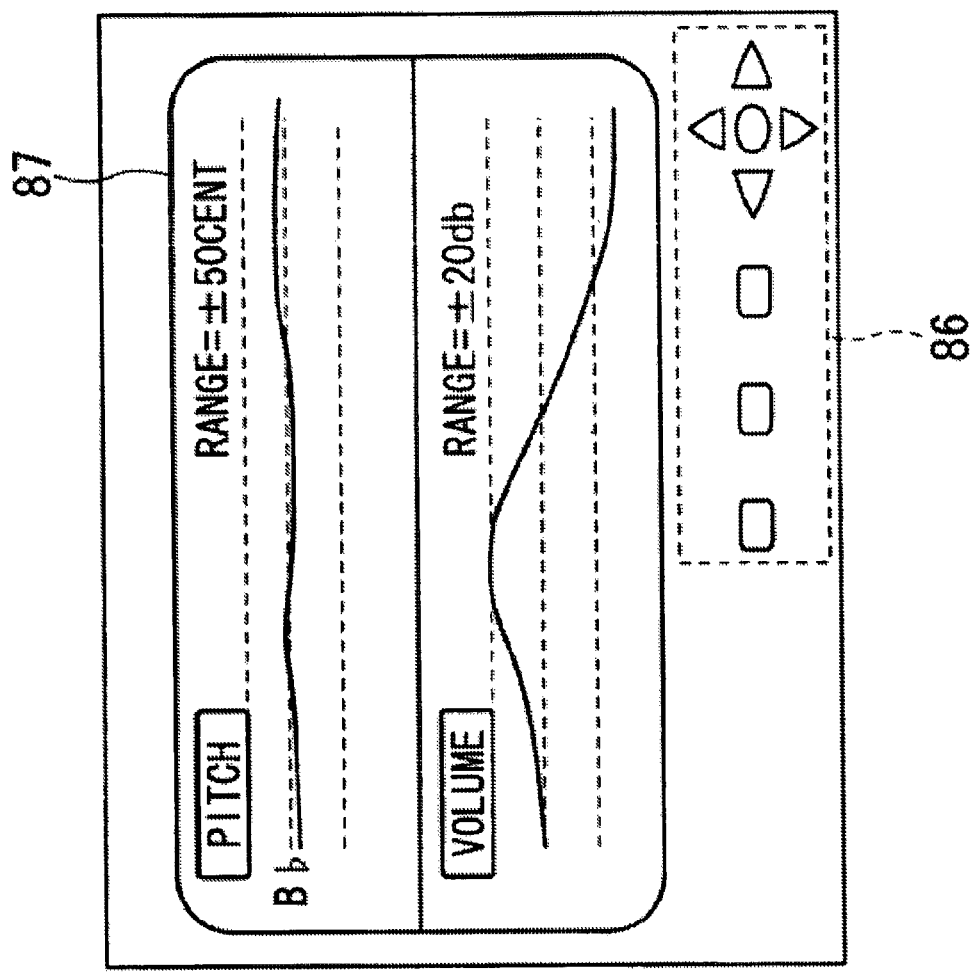
FIG. 14 is a diagram for showing a seventh display according to the present invention.

FIG. 14 is a diagram for showing a seventh display mode. In the sixth display mode shown in FIG. 13, the range of the lower portion of the display 87 is defined as ±20 db. This display mode can be employed while practicing music to keep a musical interval of a sound produced through a musical instrument constant and to change a sound volume. By changing the range, this display mode may accept a case where a sound change is large, and also a case where a sound change is small. The sound volume change is displayed in accordance with a setting value of the lower portion range carried out in the display method setting unit 18.

Figure 15:
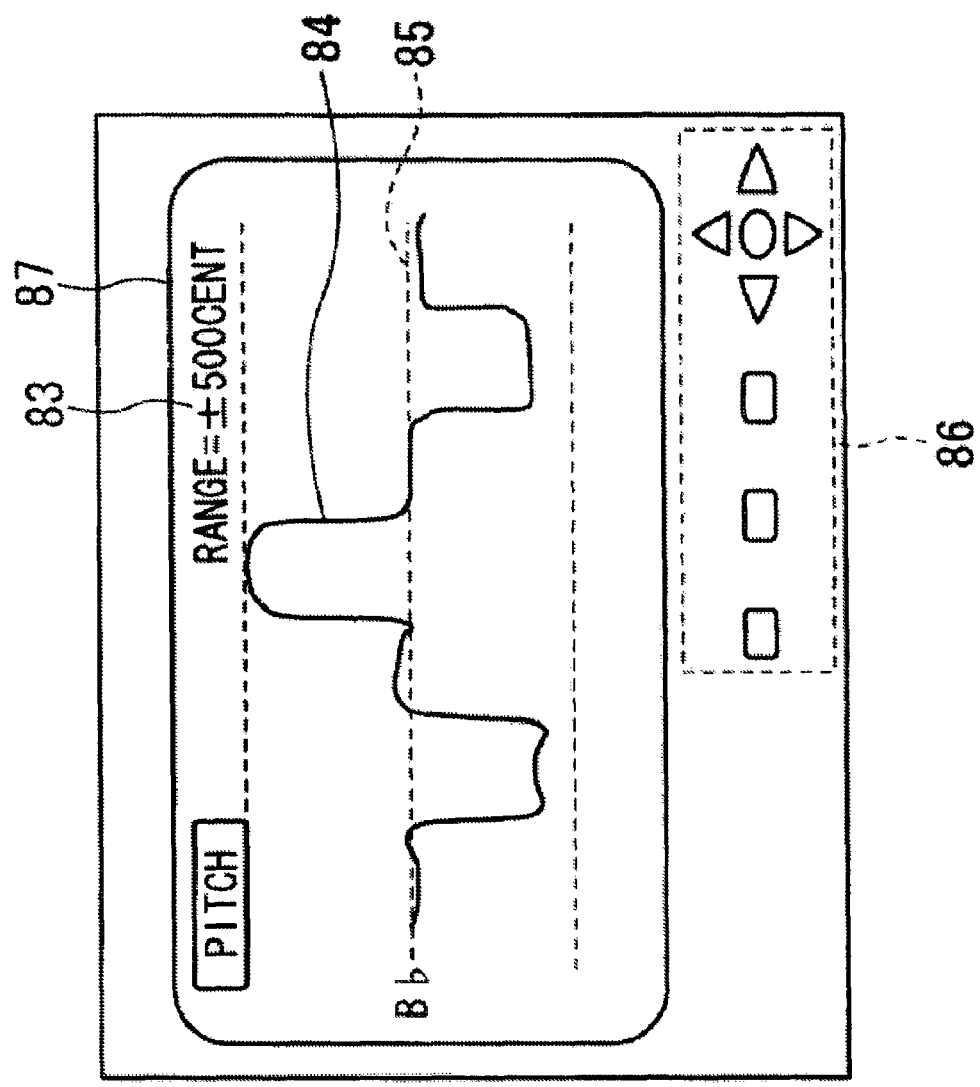
FIG. 15 is a diagram for indicating an eighth display mode according to the present invention.

FIG. 15 is a diagram for representing an eighth display mode. This eighth display mode corresponds to such a case that a musical interval is displayed on the display 87. A range 83 shows a range of indicating a musical interval. The range represents to have a range of ±500 cents. A center line 85 indicates a musical interval of B flat which corresponds to a reference sound. A musical interval line 84 indicates a musical interval of an inputted sound. This display mode may be employed in the following case. That is, when a user practices playing a brass instrument, a sound is smoothly moved within a harmonic overtone without using a tonguing, an embouchure is controlled, a syllable is used in a distinguishable manner, and a breath is controlled. When a wider range is required as in the above-mentioned case, the display screen is required to be widely used, so that the display is used as one screen.

Figure 16:
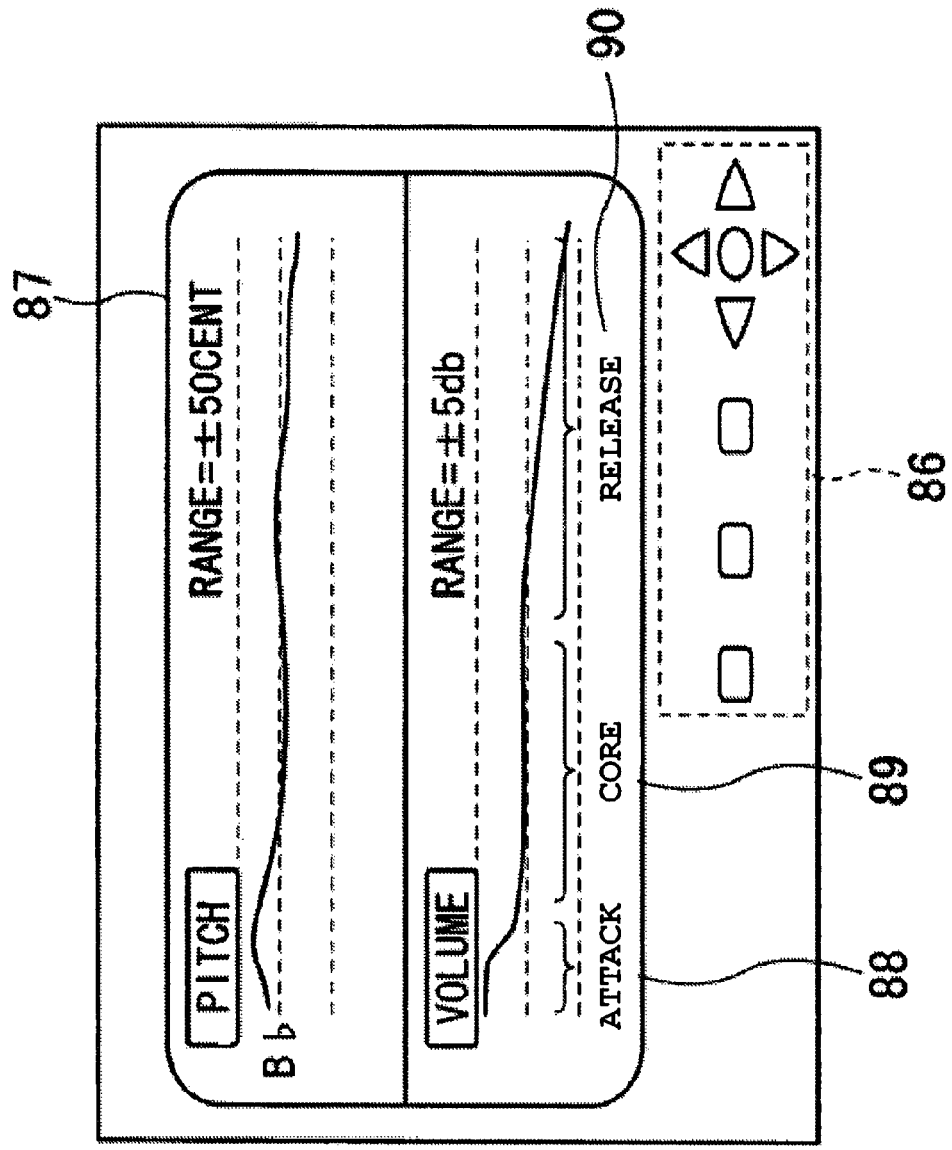
FIG. 16 is a diagram for showing a ninth display mode according to the present invention.

FIG. 16 is a diagram for showing a ninth display mode. Setting conditions of displays are identical to these of the sixth display mode. FIG. 16 represents a musical interval and a sound volume of an inputted sound. The way a user plays a musical instrument to produce a sound may be observed from conditions of musical intervals and sound volumes during an attack 88, a core 89, and a release 90.

Figure 17:
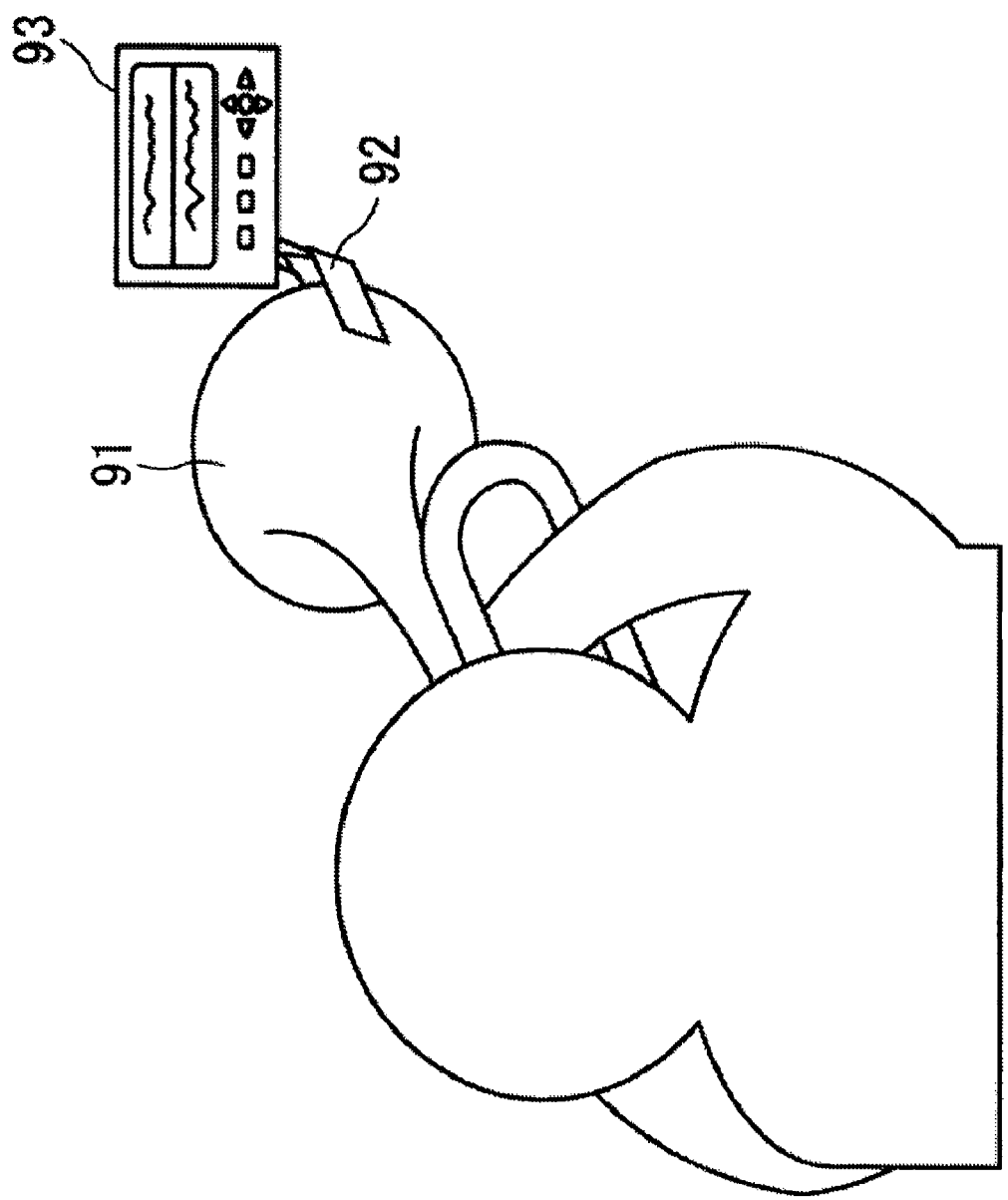
FIG. 17 is a diagram for indicating a first use mode in the present invention.

FIG. 17 is a diagram for showing a first use mode. That is, FIG. 17 is a diagram for indicating such a condition that a music practice supporting appliance 93 is mounted on a bell 91 with a clip 92. The music practice supporting appliance 93 is fixed on the musical instrument with the clip 92 and is directed to a player. Accordingly, the player can confirm conditions of musical intervals and of sound volumes while the player plays the musical instrument. The clip 92 is employed so that the music practice supporting appliance 93 is fixed on the musical instrument.

Figure 18:
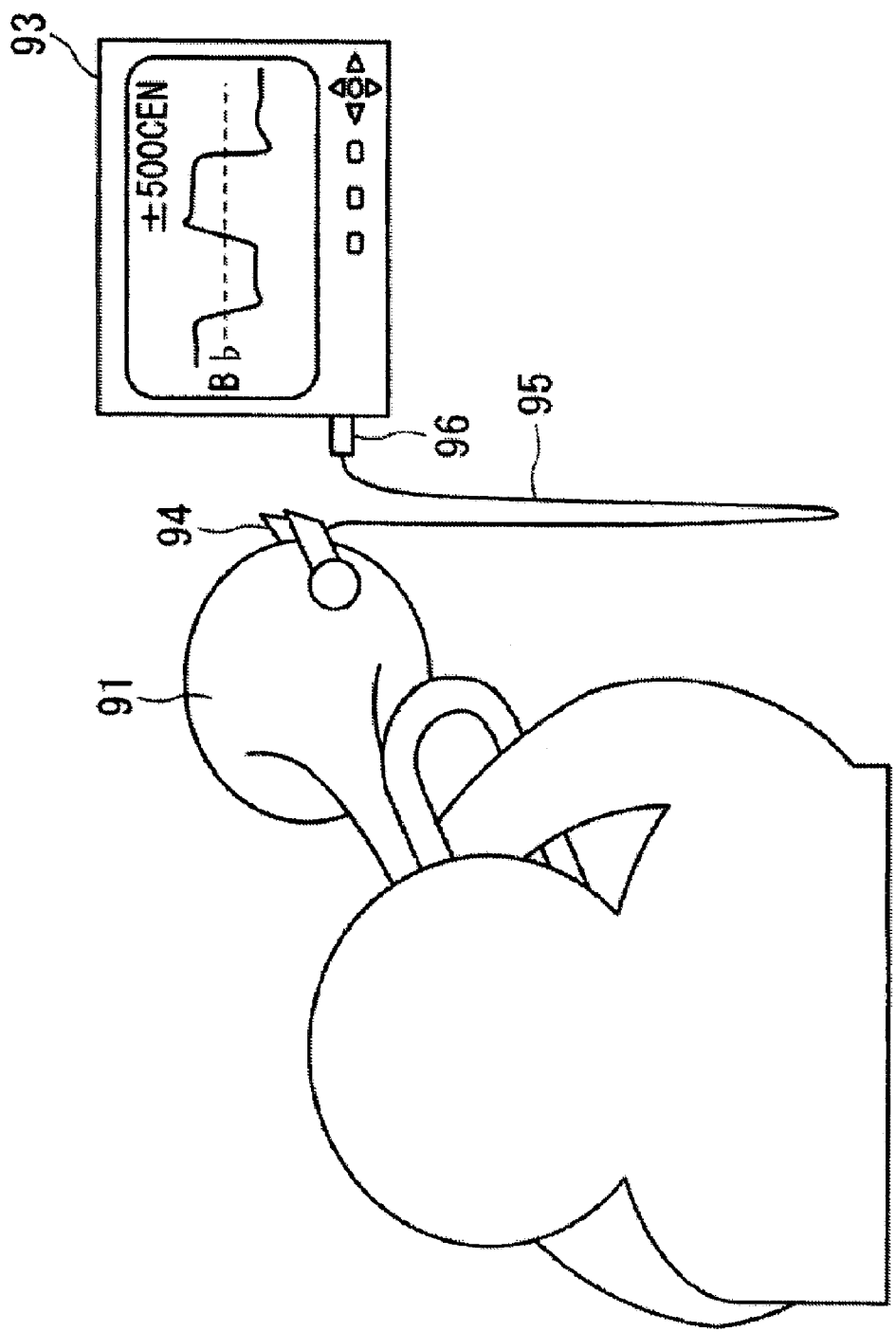
FIG. 18 is a diagram for showing a second use mode according to the present invention.

FIG. 18 is a diagram for showing a second use mode. While a clip 94 equipped with a vibration sensor is fixed on a bell 91, sounds of a musical instrument is inputted through the clip 94 equipped with a vibration sensor. An signal inputted to the clip 94 equipped with a vibration sensor is inputted via a cord 95 and a jack 96 to the music practice supporting appliance 93. Because the clip 94 equipped with a vibration sensor is lighter than the music practice supporting appliance 93, by employing the above-mentioned structure, a load due to a weigh to fan attachment can be decreased, and conditions of musical intervals and volumes of a played sound can be confirmed.

The conventional techniques have the following problems, that is, sounds such as model vocal sounds, accompanying sounds, and practice vocal sounds whose musical interval is to be detected, and sounds other than those sounds are inputted to a microphone at the same time. However, the conventional technique gives no solutions in how to discriminate the detection target sounds from a so-called "noise".

By employing the above-mentioned arrangement in which this vibration sensor is mounted on the musical instrument and sound information is inputted through vibrations, the inputs of the noise except the musical interval detecting target sounds can be suppressed and only the detection target sounds can be detected. Therefore, the conditions of the musical intervals and the volumes of the played sound can be correctly inputted. In particular, by mounting the vibration sensor oh the musical instrument, only the vibrations of the musical instrument can be directly inputted without inputting the external sound. As a result, there is such an effect that the sounds of the musical instrument whose musical interval is to be detected can be correctly inputted.

Figure 19:
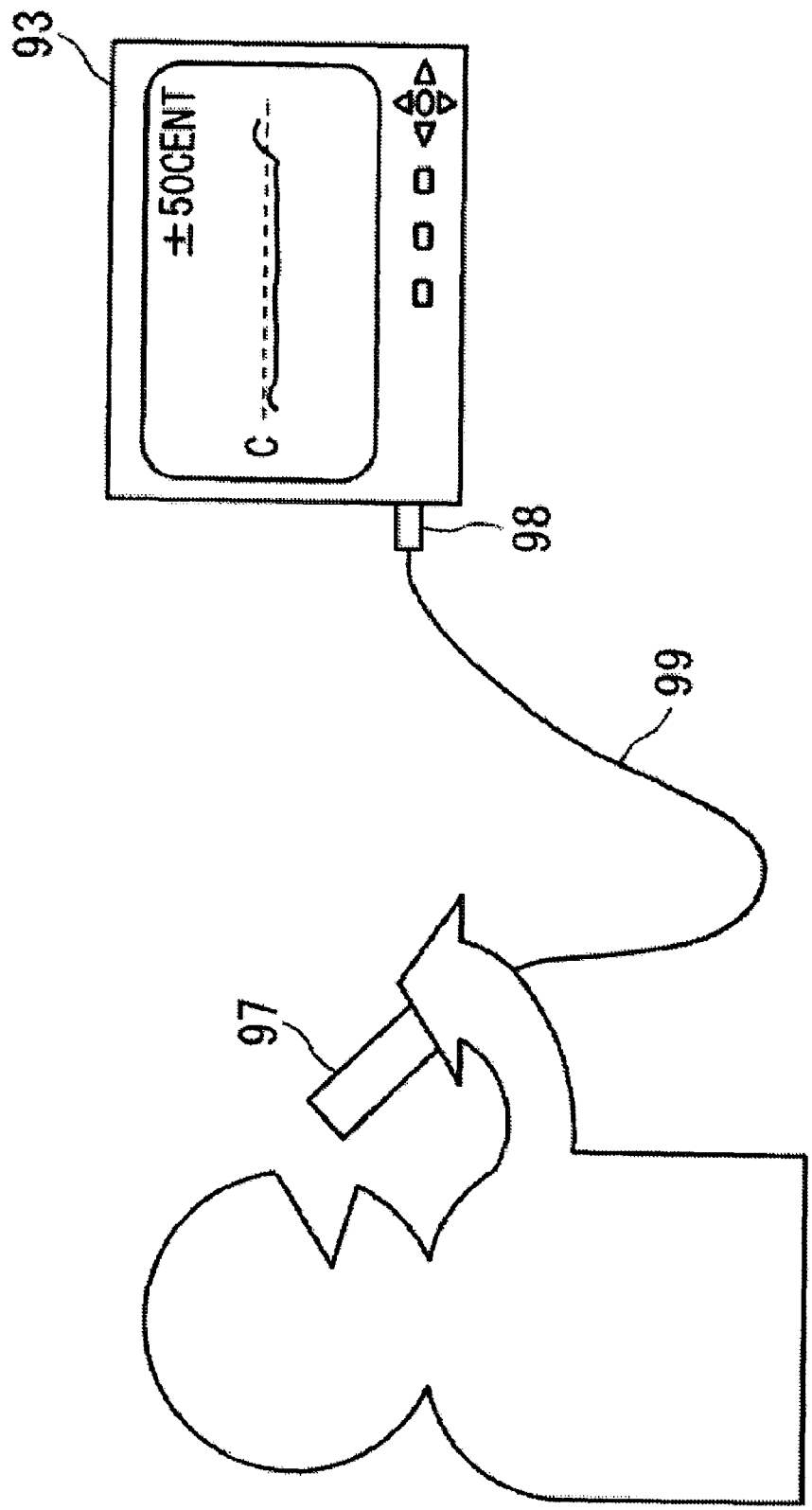
FIG. 19 is a diagram for indicating a third use mode according to the present invention.

FIG. 19 is a diagram for indicating a third use mode. Voice or sounds of playing a musical instrument or the like is inputted through a microphone 97. An input signal is inputted via a cord 99 and a jack 98 to a music practice supporting appliance 93. Alternatively, instead of the cord 99, the signal may be sent in a wireless manner.

A description is made of operations of the above-mentioned first use mode. While the clip 92 is employed as a fixing unit so as to fix the music practice supporting appliance 93 on the bell 91 of the musical instrument, vibrations of the bell 91 produced when the musical instrument is played are converted into electric signals by the piezoelectric sensor of the signal input unit 1 built in the music practice supporting appliance 93. The converted input signal is inputted to the signal amplifying unit 2 so as to be amplified. The amplified input signal is inputted to the waveform shaping unit 5 and the sample-and-hold circuit 8. The waveform shaping unit 5 converts the input signal waveform into a rectangular wave and outputs the rectangular wave to the musical interval detecting unit 6. The musical interval detecting unit 6 detects a musical interval, and then, outputs the musical interval data to the control unit 20. In the sample-and-hold unit 8, a level of an input signal is detected for every time value set in the holding time setting unit 7, for example, every 0.1 second. The detected input signal is A/D-converted into digital data, and then, sound volume information for every 0.1 second is outputted to the control unit 20.

In the control unit 20, the timer unit 3 generates a timing signal which is employed to store data in the first data memory unit 14 every 0.1 second, and the musical interval data and the sound volume data acquired every 0.1 second are stored in the first data memory unit 14. When data to be stored exceed the storage capacity of the first data memory unit 14, the older data is transferred to the second data memory 15. Also, the data to be displayed is stored in the display data memory 16, and then, is displayed on the display unit 11. Further, the control unit 20 performs the display operation of the sixth display mode shown in FIG. 13 based upon the set values of the display method setting unit 18 shown in the setting data table of FIG. 20.

The music practice supporting appliance performs the above-mentioned operations to display the time changes in the musical intervals and the sound volumes of the sounds of the musical instrument being played, so that the sounds of the musical instrument can be objectively confirmed.

As previously described, during playing music, both a change in musical intervals and a change in sound volumes are important factors to fascinate an audience. As a consequence, when a user practices playing music, or when the user confirms the own musical performance, it is important to confirm a change in sound volumes as well as deviation of musical intervals. Such an appliance capable of confirming this change in the sound volumes has been expected. Preferably, an appliance capable of simultaneously confirming both a change in musical intervals and a change in sound volumes has been desired. More preferably, such an appliance capable of easily confirming deviation from a target sound to be played has been wanted. In accordance with the present invention, during playing music, the change of the musical intervals, the change of the sound volumes, and the deviation of the musical intervals and the sound volumes of sound being played from those of the target sound can be displayed at the same time. As a consequence, it is possible to provide the music practice supporting appliance optimum for practicing music and confirming musical performance.

Also, in accordance with the present invention, since the vibrations of the music instrument are inputted to the music practice supporting appliance so as to be converted into the electric signals, the input signal being the model signal is not mixed with the input signal to be compared with this model signal, so that the musical intervals can be correctly judged. Also, in the conventional technique, the musical interval information is displayed in such a manner that the displayed information is gradually extended from the left side to the right side of the display, and when the displayed information is reached to the right edge of the display, this displayed information is reset, and then, the musical interval information is newly extended from the left side to the right side. As a result, the above-mentioned conventional technique has such a problem that the musical interval immediately before information on the leftmost side of the musical interval on the newest screen cannot be grasped. On the contrary, such a musical interval information which cannot be displayed on the screen can be stored in the second storage means, and can also be displayed.

What is claimed is:

1. A music practice supporting appliance that receives an input of a musical sound of a musical instrument and displays a deviation of one of a pitch and a sound volume of the inputted musical sound with respect to one of a pitch and a sound volume of a preset reference sound, the music practice supporting appliance comprising:

a signal input unit that receives the input of the musical sound, converts the inputted musical sound into an electric signal, and outputs the electric signal as an input signal;

an input signal amplifying unit that amplifies the input signal inputted through the signal input unit;

a waveform processing unit that converts the amplified input signal into a rectangular wave and outputs the converted amplified input signal as input signal data;

a timer unit that outputs a timing signal used to store the input signal data;

a first data memory unit that stores the input signal data in accordance with the timing signal;

a second data memory unit that stores input signal data stored in the first data memory unit when the input signal data stored in the first data memory unit exceeds a preselected storage capacity of the first data memory unit;

a control unit that controls the first data memory unit and the second data memory unit so that while the first data memory unit is receiving for storage new input signal data which exceeds the preselected storage capacity of the first data memory unit, portions of input signal data previously stored in the first data memory unit are deleted from the first data memory unit and are stored in the second data memory unit, and the new input signal data is stored in the first data memory unit;

a display unit that displays the input signal data stored in the first data memory unit and the second data memory unit;

a display information switching unit that selects one of the input signal data stored in the first data memory unit and the input signal data stored in the second data memory unit to be displayed by the display unit; and a display data memory unit that stores display data to be displayed by the display unit in accordance with a selection by the display information switching unit.

2. A music practice supporting appliance according to claim 1; further comprising a display method setting unit that sets an abscissa and an ordinate that are displayed on a screen of the display unit in accordance with a setting of the display method setting unit.

3. A music practice supporting appliance according to claim 2; wherein the display method setting unit receives an input of the input signal data, and sets a first portion of the input signal data as a predetermined value of a range to be displayed by the display unit.

4. A music practice supporting appliance according to claim 2; wherein the display method setting unit receives an input of the input signal data, and sets a minimum value and a maximum value of the input signal data as a lower limit and an upper limit, respectively, of a range to be displayed by the display unit.

5. A music practice supporting appliance according to claim 2; wherein the waveform processing unit comprises
- a waveform shaping unit that converts a waveform of the amplified input signal into the rectangular wave; and
- a musical interval detecting unit that acquires a frequency of a musical sound from the converted input signal data and detects musical interval information from the acquired frequency;
- wherein the display method setting unit includes settings of a center musical interval and a range, displays the musical interval information on the display unit, displays the center musical interval at a predetermined position of a screen of the display unit along a direction of the ordinate, displays a deviation from the center musical interval along the direction of the ordinate, and displays an elapse of time along a direction of the abscissa.

6. A music practice supporting appliance according to claim 5; wherein the waveform processing unit further comprises
- a sample-and-hold unit that detects a level of the input signal amplified by the input signal amplifying unit; and
- a hold time setting unit that sets an output holding time period of the sample-and-hold unit;
- wherein the input signal data corresponds to sound volume information of the input signal;
- wherein the display method setting unit includes settings of a center sound volume and a range, displays the sound volume information on the display unit, displays the center sound volume at a predetermined position of a screen along a direction of the ordinate, displays a deviation from the center sound volume along the direction of the ordinate, and displays an elapse of time along a direction of the abscissa; and
- wherein the display method setting unit sets a layout with respect to displays of both the musical interval information and peak information.

7. A music practice supporting appliance according to claim 1; wherein the signal input unit includes
- a vibration sensor that converts a vibration into the electric signal; and
- a fixing unit that fixes the music practice supporting appliance on a musical instrument.

8. A music practice supporting appliance according to claim 1; wherein the waveform processing unit includes
- a waveform shaping unit that converts a waveform of the amplified input signal into the rectangular wave; and
- a musical interval detecting unit that acquires a frequency of a musical sound from the converted input signal data and detects musical interval information from the acquired frequency.

9. A music practice supporting appliance according to claim 1; wherein the waveform processing unit comprises
- a sample-and-hold unit that detects a level of the input signal amplified by the input signal amplifying unit; and
- a hold time setting unit that sets an output holding time period of the sample-and-hold unit;
- wherein the input signal data corresponds to level information of the input signal.

10. A music practice supporting appliance according to claim 1; wherein the control unit controls the first data memory unit and the second data memory unit to delete from the first data memory unit and store into the second data memory unit portions of the unit input signal data in the order of the oldest input signal data stored in the first data memory unit.

11. A music practice supporting appliance comprising:
- input means for inputting a musical sound, converting the musical sound into an electric signal, and outputting the electric signal as an input signal;
- amplifying means for amplifying the input signal outputted from the input means;
- processing means for processing the amplified input signal to obtain input signal data;
- first memory means for storing the input signal data;
- second memory means for storing input signal data stored in the first memory means when the input signal data stored in the first memory means exceeds a preselected storage capacity of the first memory means;
- control means for controlling the first memory means and the second memory means so that while the first memory means is receiving for storage new input signal data which causes the first memory means to exceed the preselected storage capacity, portions of input signal data previously stored in the first memory means are deleted from the first memory means and are stored in the second memory means, and the new input signal data is stored in the first memory means;
- display means for displaying the input signal data stored in the first and second memory means; and
- selecting means for selecting one of the input signal data stored in the first memory means and the input signal data stored in the second memory means to be displayed by the display means.

12. A music practice supporting appliance according to claim 11; further comprising timing means for outputting a timing signal; and wherein the first memory means stores the input signal data in accordance with the timing signal.

13. A music practice supporting appliance comprising:
- an input unit that inputs a musical sound, converts the musical sound into an electric signal, and outputs the electric signal as an input signal;
- an amplifying unit that amplifies the input signal outputted from the input unit;
- a processing unit that processes the amplified input signal to obtain input signal data;
- a first memory unit that stores the input signal data;
- a second memory unit that stores input signal data stored in the first memory unit when the input signal data stored in the first memory unit exceeds a preselected storage capacity of the first memory unit;
- a control unit that controls the first memory unit and the second memory unit so that while the first memory unit is receiving for storage new input signal data which causes the first memory unit to exceed the preselected storage capacity, portions of input signal data previously stored in the first memory unit are deleted from the first memory unit and are stored in the second memory unit, and the new input signal data is stored in the first memory unit;
- a display unit that displays the input signal data stored in the first and second memory units; and
- a selecting unit that selects one of the input signal data stored in the first memory unit and the input signal data stored in the second memory unit to be displayed by the display unit.

14. A music practice supporting appliance according to claim 13; further comprising a timer unit that outputs a timing signal; and wherein the first memory unit stores the input signal data in accordance with the timing signal.

15. A music practice supporting appliance according to claim 13; wherein the input unit comprises a fixing unit that fixes the music practice supporting appliance on a musical instrument, and a vibration sensor that converts a mechanical vibration resulting from musical sound of the musical instrument into the electric signal.

* * * * *